(12) United States Patent
Jung et al.

(10) Patent No.: US 9,374,242 B2
(45) Date of Patent: Jun. 21, 2016

(54) USING EVALUATIONS OF TENTATIVE MESSAGE CONTENT

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
William Henry Mangione-Smith, Kirkland, WA (US); John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 1180 days.

(21) Appl. No.: 11/983,753

(22) Filed: Nov. 8, 2007

(65) Prior Publication Data
US 2009/0125914 A1      May 14, 2009

(51) Int. Cl.
*G06F 15/16* (2006.01)
*H04L 12/58* (2006.01)
*G06Q 30/02* (2012.01)

(52) U.S. Cl.
CPC ............ *H04L 12/5855* (2013.01); *G06Q 30/02* (2013.01); *H04L 51/14* (2013.01)

(58) Field of Classification Search
USPC ....................................................... 709/206
See application file for complete search history.

(56) References Cited

U.S. PATENT DOCUMENTS

| | | |
|---|---|---|
| 5,128,938 A | 7/1992 | Borras |
| 5,333,180 A | 7/1994 | Brown et al. |
| 5,548,535 A | 8/1996 | Zvonar |
| 5,596,750 A | 1/1997 | Li et al. |
| 5,812,865 A | 9/1998 | Theimer et al. |
| 5,892,909 A | 4/1999 | Grasso et al. |
| 5,914,726 A | 6/1999 | Schultz |
| 6,006,225 A | 12/1999 | Bowman et al. |
| 6,009,433 A | 12/1999 | Kurano et al. |
| 6,014,716 A | 1/2000 | Ohara |
| 6,031,453 A | 2/2000 | Brinzer |
| 6,074,787 A | 6/2000 | Takeuchi |
| 6,081,816 A | 6/2000 | Agrawal |
| 6,105,072 A | 8/2000 | Fischer |
| 6,151,311 A | 11/2000 | Wheatley, III et al. |
| 6,157,379 A | 12/2000 | Singh |
| 6,192,396 B1 | 2/2001 | Kohler |
| 6,208,954 B1 | 3/2001 | Houtchens |
| 6,212,553 B1 | 4/2001 | Lee et al. |
| 6,219,731 B1 | 4/2001 | Gutowitz |
| 6,237,141 B1 | 5/2001 | Holzle et al. |
| 6,243,378 B1 | 6/2001 | Olnowich |
| 6,263,311 B1 | 7/2001 | Dildy |
| 6,266,675 B1 | 7/2001 | Evans et al. |
| 6,275,954 B1 | 8/2001 | Herman et al. |
| 6,287,125 B1 | 9/2001 | Dorcely |

(Continued)

OTHER PUBLICATIONS

"Called-Party Camp-On"; Wikipedia, The Free Encyclopedia; bearing a date of Mar. 20, 2007; printed on Apr. 2, 2007; p. 1; located at: http://en.wikipedia.org/wiki/Called-party_camp-on.

(Continued)

*Primary Examiner* — Richard G Keehn

(57) ABSTRACT

A system, method, computer program product, and carrier are described for obtaining one or more evaluation parameters in association with a message content destination selection and transmitting at least a tentative-message-content evaluation result from an application of the one or more evaluation parameters to tentative-message-content.

40 Claims, 14 Drawing Sheets

(56) References Cited

U.S. PATENT DOCUMENTS

| | | | |
|---|---|---|---|
| 6,308,148 B1 | 10/2001 | Bruins et al. | |
| 6,320,112 B1 | 11/2001 | Lotze | |
| 6,341,359 B1 | 1/2002 | Aiken et al. | |
| 6,349,238 B1 | 2/2002 | Gabbita et al. | |
| 6,374,221 B1 | 4/2002 | Haimi-Cohen | |
| 6,377,953 B1 | 4/2002 | Gawlick et al. | |
| 6,378,128 B1 | 4/2002 | Edelstein et al. | |
| 6,389,475 B1 | 5/2002 | Speakman et al. | |
| 6,401,100 B1 | 6/2002 | Gladieux | |
| 6,418,136 B1 | 7/2002 | Naor et al. | |
| 6,418,424 B1 | 7/2002 | Hoffberg et al. | |
| 6,424,946 B1 | 7/2002 | Trischler et al. | |
| 6,425,128 B1 | 7/2002 | Krapf et al. | |
| 6,430,573 B1 | 8/2002 | Pachet et al. | |
| 6,452,607 B1 | 9/2002 | Livingston | |
| 6,480,885 B1 | 11/2002 | Olivier | |
| 6,496,600 B1 | 12/2002 | Huang | |
| 6,526,258 B2 | 2/2003 | Bejar et al. | |
| 6,539,050 B1 | 3/2003 | Lee et al. | |
| 6,539,376 B1 | 3/2003 | Sundaresan et al. | |
| 6,546,005 B1 | 4/2003 | Berkley et al. | |
| 6,549,950 B2 | 4/2003 | Lytle et al. | |
| 6,560,576 B1 | 5/2003 | Cohen et al. | |
| 6,564,321 B2 | 5/2003 | Bobo, II | |
| 6,565,610 B1 | 5/2003 | Wang et al. | |
| 6,570,850 B1 | 5/2003 | Gutierrez et al. | |
| 6,574,744 B1 | 6/2003 | Kantz et al. | |
| 6,594,630 B1 | 7/2003 | Zlokarnik et al. | |
| 6,594,654 B1 | 7/2003 | Salam et al. | |
| 6,594,672 B1 | 7/2003 | Lampson et al. | |
| 6,614,551 B1 | 9/2003 | Peek | |
| 6,621,892 B1 | 9/2003 | Banister et al. | |
| 6,629,635 B1 | 10/2003 | Akamine | |
| 6,633,868 B1 | 10/2003 | Min et al. | |
| 6,662,223 B1 | 12/2003 | Zhang et al. | |
| 6,678,360 B1 | 1/2004 | Katz | |
| 6,690,390 B1 | 2/2004 | Walters et al. | |
| 6,691,159 B1 | 2/2004 | Grewal et al. | |
| 6,700,591 B1 | 3/2004 | Sharpe | |
| 6,700,678 B1 | 3/2004 | Luman | |
| 6,704,905 B2 | 3/2004 | Fukushige et al. | |
| 6,711,291 B1 | 3/2004 | Stubler et al. | |
| 6,724,373 B1 | 4/2004 | O'Neill, Jr. et al. | |
| 6,725,229 B2 | 4/2004 | Majewski et al. | |
| 6,748,320 B2 | 6/2004 | Jones | |
| 6,751,593 B2 | 6/2004 | Tetsumoto | |
| 6,760,748 B1 | 7/2004 | Hakim | |
| 6,772,396 B1 | 8/2004 | Cronin et al. | |
| 6,775,358 B1 | 8/2004 | Breitenbach et al. | |
| 6,785,341 B2 | 8/2004 | Walton et al. | |
| 6,785,867 B2 | 8/2004 | Shaffer et al. | |
| 6,788,308 B2 | 9/2004 | Reavy et al. | |
| 6,795,860 B1 | 9/2004 | Shah | |
| 6,804,224 B1 | 10/2004 | Schuster et al. | |
| 6,810,422 B1 | 10/2004 | Cross | |
| 6,813,043 B1 | 11/2004 | Mizuyama et al. | |
| 6,813,507 B1 | 11/2004 | Gress et al. | |
| 6,816,901 B1 | 11/2004 | Sitaraman et al. | |
| 6,820,079 B1 | 11/2004 | Evans | |
| 6,829,613 B1 * | 12/2004 | Liddy | 707/694 |
| 6,839,777 B1 | 1/2005 | Vrancic et al. | |
| 6,842,860 B1 | 1/2005 | Branstad et al. | |
| 6,850,988 B1 | 2/2005 | Reed | |
| 6,851,049 B1 | 2/2005 | Price, III | |
| 6,868,427 B2 | 3/2005 | Herzog et al. | |
| 6,892,330 B2 | 5/2005 | Lee | |
| 6,892,352 B1 | 5/2005 | Myers | |
| 6,895,426 B1 | 5/2005 | Cortright et al. | |
| 6,904,168 B1 | 6/2005 | Steinberg et al. | |
| 6,904,183 B2 | 6/2005 | Slatter | |
| 6,907,277 B1 | 6/2005 | Shim | |
| 6,910,028 B2 | 6/2005 | Chan et al. | |
| 6,910,033 B2 | 6/2005 | Rosenblum | |
| 6,910,067 B1 | 6/2005 | Sitaraman et al. | |
| 6,925,458 B2 | 8/2005 | Scaturro et al. | |
| 6,934,889 B2 | 8/2005 | Owari | |
| 6,934,916 B1 | 8/2005 | Webb et al. | |
| 6,937,766 B1 | 8/2005 | Wilf et al. | |
| 6,938,196 B2 | 8/2005 | Richardson et al. | |
| 6,941,466 B2 | 9/2005 | Mastrianni | |
| 6,941,513 B2 | 9/2005 | Meystel et al. | |
| 6,947,068 B2 | 9/2005 | Forkner et al. | |
| 6,947,948 B2 | 9/2005 | Wang et al. | |
| 6,959,389 B1 | 10/2005 | Dunn et al. | |
| 6,961,766 B2 | 11/2005 | Janosik, Jr. et al. | |
| 6,981,023 B1 | 12/2005 | Hamilton et al. | |
| 6,985,172 B1 | 1/2006 | Rigney et al. | |
| 6,985,830 B2 | 1/2006 | Lee et al. | |
| 6,987,840 B1 | 1/2006 | Bosik et al. | |
| 6,990,525 B1 | 1/2006 | Ying et al. | |
| 6,993,563 B2 | 1/2006 | Lytle et al. | |
| 6,999,469 B1 | 2/2006 | Chu et al. | |
| 6,999,721 B2 * | 2/2006 | Ollis et al. | 455/41.2 |
| 7,006,827 B2 | 2/2006 | Masuda et al. | |
| 7,010,616 B2 | 3/2006 | Carlson et al. | |
| 7,020,651 B2 | 3/2006 | Ripley | |
| 7,020,688 B2 | 3/2006 | Sykes, Jr. | |
| 7,027,645 B2 | 4/2006 | Swift | |
| 7,031,438 B1 | 4/2006 | Cheston, III et al. | |
| 7,038,680 B2 | 5/2006 | Pitkow | |
| 7,039,637 B2 | 5/2006 | Murray et al. | |
| 7,054,421 B2 | 5/2006 | Kandlur et al. | |
| 7,054,882 B2 | 5/2006 | Dockter et al. | |
| 7,058,688 B2 | 6/2006 | Lin | |
| 7,062,508 B2 | 6/2006 | Andreev et al. | |
| 7,062,535 B1 | 6/2006 | Stark et al. | |
| 7,072,901 B2 | 7/2006 | Teraguchi et al. | |
| 7,072,942 B1 | 7/2006 | Maller | |
| 7,076,485 B2 | 7/2006 | Bloedorn | |
| 7,076,533 B1 | 7/2006 | Knox et al. | |
| 7,080,384 B2 | 7/2006 | Wall et al. | |
| 7,089,256 B2 | 8/2006 | Smialek | |
| 7,089,497 B2 | 8/2006 | Abbott et al. | |
| 7,095,855 B1 | 8/2006 | Collins | |
| 7,103,154 B1 | 9/2006 | Cannon et al. | |
| 7,107,291 B2 | 9/2006 | Nishikawa et al. | |
| 7,110,664 B2 | 9/2006 | Yogeshwar et al. | |
| 7,110,890 B2 | 9/2006 | Birkett et al. | |
| 7,117,210 B2 | 10/2006 | DeSalvo | |
| 7,119,923 B1 | 10/2006 | Iwaki | |
| 7,120,628 B1 | 10/2006 | Conmy et al. | |
| 7,124,302 B2 | 10/2006 | Ginter et al. | |
| 7,130,887 B2 | 10/2006 | Goldberg | |
| 7,131,107 B2 | 10/2006 | Wall et al. | |
| 7,133,880 B1 | 11/2006 | Nori et al. | |
| 7,137,106 B2 | 11/2006 | Herman et al. | |
| 7,139,825 B2 | 11/2006 | Andaker et al. | |
| 7,143,083 B2 | 11/2006 | Carlbom et al. | |
| 7,143,140 B2 | 11/2006 | Dennis | |
| 7,146,134 B2 | 12/2006 | Moon et al. | |
| 7,146,234 B2 | 12/2006 | Woehler | |
| 7,149,649 B2 | 12/2006 | Haft et al. | |
| 7,149,780 B2 | 12/2006 | Quine et al. | |
| 7,159,029 B2 | 1/2007 | Laarhuis et al. | |
| 7,162,474 B1 | 1/2007 | Harker et al. | |
| 7,162,515 B2 | 1/2007 | Engstrom | |
| 7,164,921 B2 | 1/2007 | Owens et al. | |
| 7,177,816 B2 | 2/2007 | Ehlen et al. | |
| 7,181,694 B2 | 2/2007 | Reiss et al. | |
| 7,188,338 B2 | 3/2007 | Ito | |
| 7,191,117 B2 | 3/2007 | Kirby et al. | |
| 7,191,252 B2 | 3/2007 | Redlich et al. | |
| 7,194,656 B2 | 3/2007 | Hayward | |
| 7,200,592 B2 | 4/2007 | Goodwin et al. | |
| 7,200,678 B1 | 4/2007 | Bettadahalli et al. | |
| 7,206,778 B2 | 4/2007 | Bode et al. | |
| 7,209,880 B1 | 4/2007 | Gajic et al. | |
| 7,209,916 B1 | 4/2007 | Seshadri et al. | |
| 7,212,807 B2 | 5/2007 | Laumen et al. | |
| 7,213,260 B2 | 5/2007 | Judge | |
| 7,216,056 B2 | 5/2007 | Kubota et al. | |
| 7,222,309 B2 | 5/2007 | Chupin et al. | |
| 7,224,778 B2 | 5/2007 | Aoki | |
| 7,228,134 B2 | 6/2007 | Gandhi et al. | |

(56) References Cited

U.S. PATENT DOCUMENTS

| | | | |
|---|---|---|---|
| 7,228,334 B1 | 6/2007 | Jordan, Jr. | |
| 7,233,803 B2 | 6/2007 | Nielsen et al. | |
| 7,237,010 B2 | 6/2007 | Mora | |
| 7,239,985 B1 | 7/2007 | Hysom et al. | |
| 7,240,041 B2 | 7/2007 | Martin et al. | |
| 7,240,355 B1 | 7/2007 | Eldering | |
| 7,242,421 B2 | 7/2007 | Center, Jr. et al. | |
| 7,242,493 B2 | 7/2007 | Hall et al. | |
| 7,242,988 B1 | 7/2007 | Hoffberg et al. | |
| 7,243,130 B2 | 7/2007 | Horvitz et al. | |
| 7,277,944 B1 | 10/2007 | Davie et al. | |
| 7,317,697 B2 | 1/2008 | Lewis et al. | |
| 7,346,418 B2 | 3/2008 | Lowe | |
| 7,353,034 B2 | 4/2008 | Haney | |
| 7,366,780 B2 | 4/2008 | Keller et al. | |
| 7,395,507 B2 | 7/2008 | Robarts et al. | |
| 7,630,371 B2 | 12/2009 | Hernandez et al. | |
| 7,672,267 B2 | 3/2010 | Tsai et al. | |
| 7,756,929 B1* | 7/2010 | Pettigrew et al. | 709/206 |
| 7,929,443 B1 | 4/2011 | Anumala | |
| 7,941,491 B2* | 5/2011 | Sood | 709/206 |
| 7,945,954 B2* | 5/2011 | Coueignoux | 726/22 |
| 7,996,470 B2* | 8/2011 | Daniell | 709/206 |
| 7,996,473 B2* | 8/2011 | Braam | 709/206 |
| 8,086,672 B2* | 12/2011 | Horvitz | 709/206 |
| 8,112,485 B1* | 2/2012 | Cooley et al. | 709/206 |
| 8,195,744 B2 | 6/2012 | Julia et al. | |
| 2001/0037311 A1 | 11/2001 | McCoy et al. | |
| 2001/0037493 A1 | 11/2001 | Herman et al. | |
| 2001/0039522 A1 | 11/2001 | Saxon | |
| 2002/0035536 A1 | 3/2002 | Gellman | |
| 2002/0069200 A1 | 6/2002 | Cooper et al. | |
| 2002/0083118 A1 | 6/2002 | Sim | |
| 2002/0107931 A1 | 8/2002 | Singh et al. | |
| 2002/0147645 A1 | 10/2002 | Alao et al. | |
| 2002/0178086 A1 | 11/2002 | Margeson et al. | |
| 2002/0178224 A1 | 11/2002 | Kasajima | |
| 2003/0054839 A1 | 3/2003 | Ono | |
| 2003/0134616 A1 | 7/2003 | Thomsen et al. | |
| 2003/0140235 A1 | 7/2003 | Immega et al. | |
| 2003/0172119 A1 | 9/2003 | Hosali et al. | |
| 2003/0217333 A1 | 11/2003 | Smith et al. | |
| 2003/0225850 A1 | 12/2003 | Teague | |
| 2003/0236729 A1 | 12/2003 | Epstein et al. | |
| 2004/0030550 A1 | 2/2004 | Liu et al. | |
| 2004/0039630 A1 | 2/2004 | Begole et al. | |
| 2004/0044774 A1 | 3/2004 | Mangalik et al. | |
| 2004/0117326 A1 | 6/2004 | Amato | |
| 2004/0117501 A1 | 6/2004 | Day et al. | |
| 2004/0128347 A1 | 7/2004 | Mason et al. | |
| 2004/0139000 A1 | 7/2004 | Amos | |
| 2004/0139314 A1 | 7/2004 | Cook et al. | |
| 2004/0176107 A1 | 9/2004 | Chadha | |
| 2004/0180668 A1 | 9/2004 | Owens et al. | |
| 2004/0203949 A1* | 10/2004 | Nielsen et al. | 455/466 |
| 2004/0215453 A1 | 10/2004 | Orbach | |
| 2004/0215723 A1 | 10/2004 | Chadha | |
| 2004/0215726 A1* | 10/2004 | Arning et al. | 709/206 |
| 2004/0220705 A1 | 11/2004 | Basir et al. | |
| 2004/0243719 A1 | 12/2004 | Roselinsky | |
| 2004/0243844 A1 | 12/2004 | Adkins | |
| 2005/0002417 A1 | 1/2005 | Kelly et al. | |
| 2005/0021649 A1 | 1/2005 | Goodman et al. | |
| 2005/0136903 A1 | 6/2005 | Kashima et al. | |
| 2005/0136904 A1 | 6/2005 | Siddiqui | |
| 2005/0154636 A1 | 7/2005 | Hildinger et al. | |
| 2005/0177456 A1 | 8/2005 | Rossides | |
| 2005/0186968 A1 | 8/2005 | Durst et al. | |
| 2005/0188031 A1 | 8/2005 | Zandt | |
| 2005/0188043 A1 | 8/2005 | Cortright et al. | |
| 2005/0193073 A1 | 9/2005 | Mehr et al. | |
| 2005/0195076 A1 | 9/2005 | McCulloch et al. | |
| 2005/0198054 A1 | 9/2005 | Sankaran | |
| 2005/0210115 A1* | 9/2005 | Naito et al. | 709/206 |
| 2005/0227691 A1* | 10/2005 | Pecen et al. | 455/435.2 |
| 2005/0233757 A1 | 10/2005 | Choi | |
| 2005/0251555 A1* | 11/2005 | Little, II | 709/206 |
| 2005/0256769 A1 | 11/2005 | Rossides | |
| 2006/0013368 A1 | 1/2006 | LaBaw | |
| 2006/0018445 A1 | 1/2006 | Mittal | |
| 2006/0036783 A1 | 2/2006 | Aarts | |
| 2006/0047634 A1 | 3/2006 | Aaron et al. | |
| 2006/0072154 A1* | 4/2006 | Kim | 358/1.15 |
| 2006/0078122 A1 | 4/2006 | Dacosta | |
| 2006/0089152 A1 | 4/2006 | Mahonen | |
| 2006/0101514 A1 | 5/2006 | Milener et al. | |
| 2006/0161457 A1 | 7/2006 | Rapaport et al. | |
| 2006/0178949 A1 | 8/2006 | McGrath | |
| 2007/0016647 A1 | 1/2007 | Gupta et al. | |
| 2007/0061327 A1 | 3/2007 | Oscherov et al. | |
| 2007/0061433 A1 | 3/2007 | Reynolds et al. | |
| 2007/0070979 A1 | 3/2007 | Kim et al. | |
| 2007/0103548 A1 | 5/2007 | Carter | |
| 2007/0124378 A1 | 5/2007 | Elzur | |
| 2007/0130599 A1 | 6/2007 | Monroe | |
| 2007/0150571 A1 | 6/2007 | Haga et al. | |
| 2007/0173266 A1 | 7/2007 | Barnes, Jr. | |
| 2007/0198483 A1 | 8/2007 | Li et al. | |
| 2007/0207727 A1 | 9/2007 | Song et al. | |
| 2007/0220607 A1 | 9/2007 | Sprosts et al. | |
| 2007/0241885 A1 | 10/2007 | Clipsham | |
| 2007/0245300 A1 | 10/2007 | Chan et al. | |
| 2007/0262861 A1 | 11/2007 | Anderson et al. | |
| 2007/0282654 A1 | 12/2007 | Sarkar | |
| 2007/0293048 A1 | 12/2007 | Lee et al. | |
| 2007/0297329 A1 | 12/2007 | Park et al. | |
| 2008/0010106 A1 | 1/2008 | Bourne et al. | |
| 2008/0014910 A1 | 1/2008 | Hsu et al. | |
| 2008/0016160 A1 | 1/2008 | Walter et al. | |
| 2008/0016248 A1 | 1/2008 | Tsirtsis et al. | |
| 2008/0028090 A1 | 1/2008 | Kok et al. | |
| 2008/0030322 A1 | 2/2008 | Stauffer et al. | |
| 2008/0040151 A1 | 2/2008 | Moore | |
| 2008/0070593 A1 | 3/2008 | Altman et al. | |
| 2008/0162652 A1* | 7/2008 | True et al. | 709/206 |
| 2008/0162860 A1 | 7/2008 | Sabbatini et al. | |
| 2008/0168074 A1 | 7/2008 | Inagaki | |
| 2008/0214142 A1 | 9/2008 | Morin et al. | |
| 2008/0320088 A1 | 12/2008 | Jung et al. | |
| 2008/0320089 A1 | 12/2008 | Jung et al. | |
| 2008/0320098 A1 | 12/2008 | Jung et al. | |
| 2009/0034851 A1 | 2/2009 | Fan et al. | |
| 2009/0063518 A1 | 3/2009 | Jung et al. | |
| 2009/0259730 A1 | 10/2009 | Machida et al. | |
| 2010/0124905 A1 | 5/2010 | Pratt et al. | |
| 2010/0250682 A1 | 9/2010 | Goldberg et al. | |
| 2010/0316045 A1 | 12/2010 | Przybysz et al. | |
| 2012/0069131 A1 | 3/2012 | Abelow | |
| 2013/0091192 A1 | 4/2013 | Shafi et al. | |
| 2013/0091214 A1 | 4/2013 | Kellerman et al. | |

OTHER PUBLICATIONS

FutureMe.org; bearing a date of Jan. 22, 2006; printed on Apr. 2, 2007; pp. 1-3; located at: http://futureme.org/public.php?id=218620.

Huang, Dawei; Liu, Fang; Shi, Xiangdong; Yang, Guangxin; Zheng, Ludi; Zhou, Zhiyu; "MapWeb: A Location-Based Converged Communications Platform"; Bell Labs Technical Journal; bearing a date of 2006; pp. 159-171; vol. 11, No. 1; Wiley Periodicals, Inc.; located at; www.interscience.wiley.com.

"Intro Writing Do's | Don'ts"; Happen Magazine—Match.com's advice center; printed Apr. 4, 2007; pp. 1-2; located at: http://www.match.com/matchscene/tips.aspx?articleid=4511.

Khan, Omar; "Context and Context-Aware Computing"; Fall 2006; pp. 1-40; CS260.

McKinley, Philip K.; Padmanabhan, Udiyan I.; Ancha, Nandagopal; Sadjadi, Seyed Masoud; "Composable Proxy Services to Support Collaboration on the Mobile Internet"; IEEE Transactions on Computers; bearing a date of Jun. 2003; pp. 713-726; vol. 52, No. 6; IEEE Computer Society.

McKinley, Philip K.; Sadjadi, Seyed Masoud; Kasten, Eric P.; Cheng, Betty H.C.; "A Taxonomy of Compositional Adaptation"; Technical Report MSU-CSE-04/17; bearing a date of May 2004 and Jul. 2004; pp. 1-48; located at: http://www.cse.msu.edu/rapidware/survey.

(56) References Cited

OTHER PUBLICATIONS

Morris, John; Peterson, Jon; "Who's Watching You Now?"; IEEE Security & Privacy: Building Confidence in a Networked World; bearing a date of Jan.-Feb. 2007; pp. 76-79; vol. 5, No. 1; IEEE Computer Society.

"Oops!"; Match.com—Find Singles at the World's Largest Online Dating Personals Service; printed on Apr. 4, 2007; pp. 1-3; located at: http://www.match.com/profile/myprofile.aspx?sect=6.

"Open Source Rule Engines Written in Java"; Manageability; printed on May 2, 2007; pp. 1-7; located at: http://www.manageability.org/blog/stuff/rule_engines/view.

Terdiman, Daniel; "A Cure for E-Mail Attention Disorder?"; CNET News.com; bearing a date of Feb. 28, 2007; pp. 1-3; located at: http://news.com/A+cure+for+e-mail+attention+disorder/2100-.

Van Grove, Jennifer; "Can a Gmail Tool Make Us More Considerate Email Senders?"; Mashable; printed on Jun. 8, 2011; pp. 1-3; located at: http://mashable.com/2011/06/07/courteously/.

\* cited by examiner

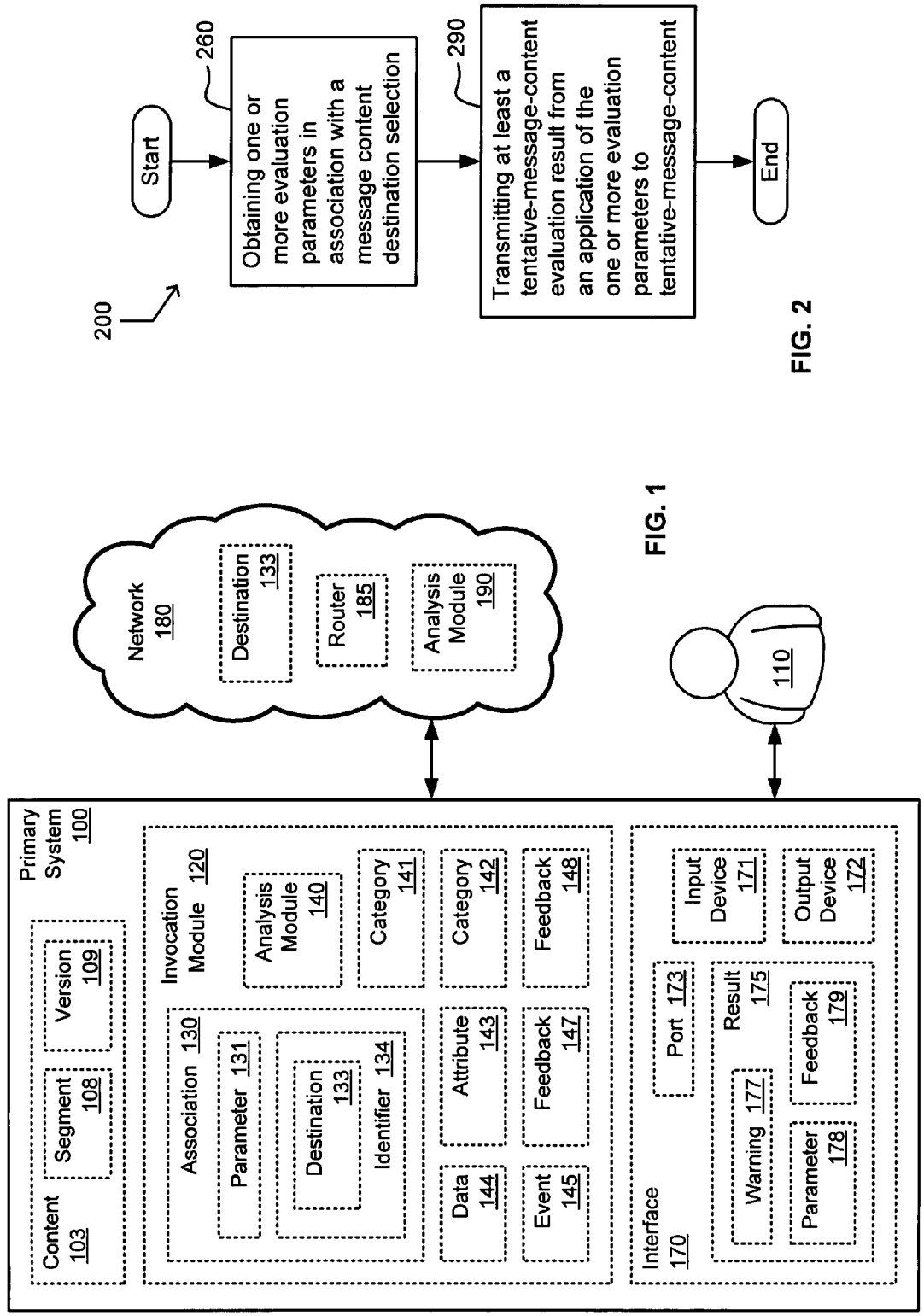

USING EVALUATIONS OF TENTATIVE MESSAGE CONTENT

SUMMARY

In one aspect, a method includes but is not limited to obtaining one or more evaluation parameters in association with a message content destination selection and transmitting at least a tentative-message-content evaluation result from an application of the one or more evaluation parameters to tentative-message-content. In addition to the foregoing, other method aspects are described in the claims, drawings, and text forming a part of the present disclosure.

In one or more various aspects, related systems include but are not limited to virtually any combination of hardware, software, and/or firmware configured to effect the herein-referenced method aspects depending upon the design choices of the system designer.

In one aspect, a system includes but is not limited to circuitry for obtaining one or more evaluation parameters in association with a message content destination selection and circuitry for transmitting at least a tentative-message-content evaluation result from an application of the one or more evaluation parameters to tentative-message-content. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 1 depicts an exemplary environment in which one or more technologies may be implemented.

FIG. 2 depicts a high-level logic flow of an operational process.

DETAILED DESCRIPTION

Figure 3:
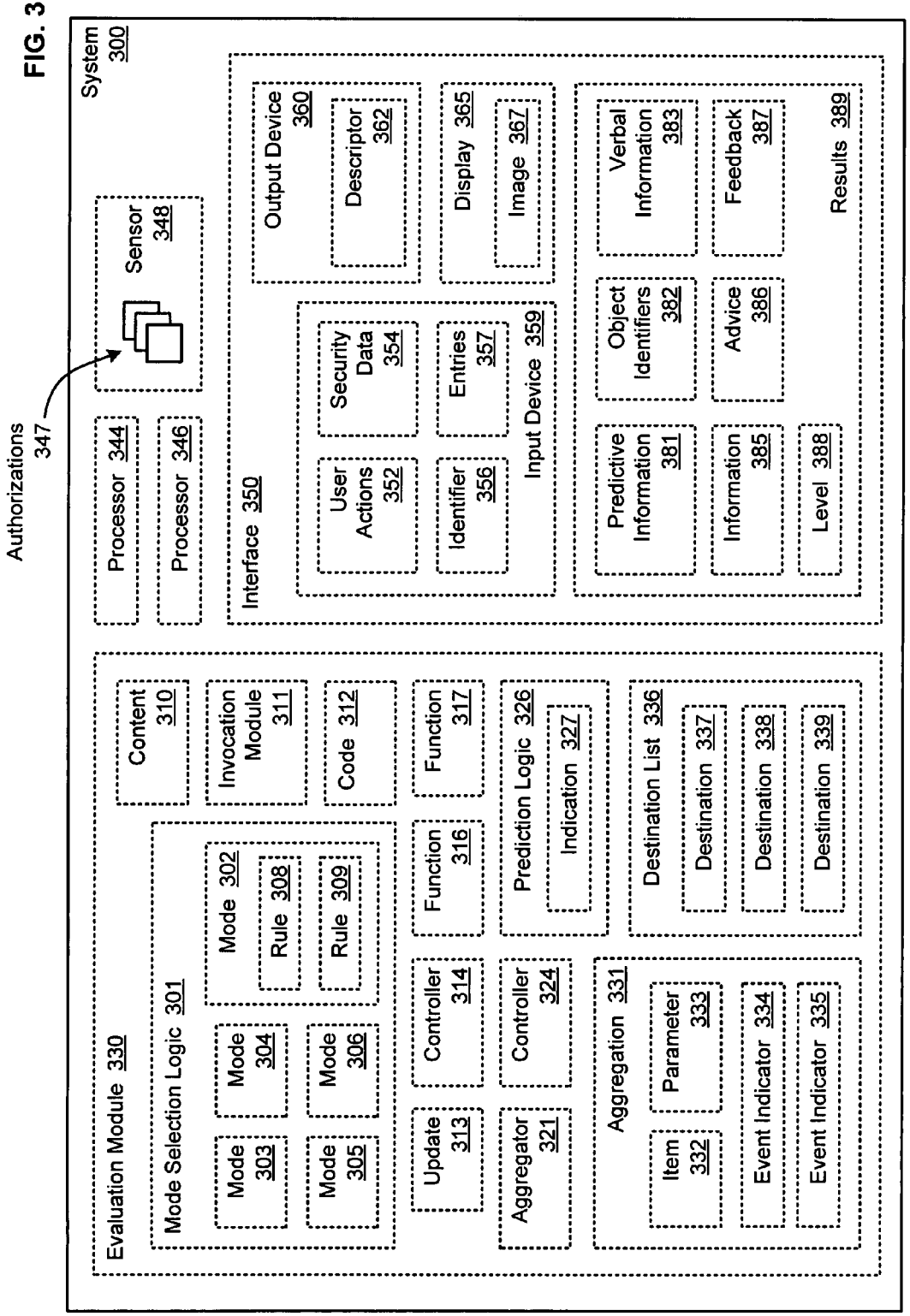
FIGS. 3-13 depict other exemplary environments in each of which one or more technologies may be implemented.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In the following detailed description, reference is made to the accompanying drawings, which form a part hereof. The use of the same symbols in different drawings typically indicates similar or identical items. The illustrative embodiments described in the detailed description, drawings, and claims are not meant to be limiting. Other embodiments may be utilized, and other changes may be made, without departing from the spirit or scope of the subject matter presented here.

Following are a series of systems and flowcharts depicting implementations of processes. For ease of understanding, the flowcharts are organized such that the initial flowcharts present implementations via an initial "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

With reference now to FIG. 1, shown is an example of a system that may serve as a context for introducing one or more processes and/or devices described herein. As shown one or more instances of primary system 100 may be operably (directly or indirectly) accessible to one or more users 110 or networks 180. Network 180 may include one or more instances of destinations 133, routers 185, or analysis modules 190. Primary system 100 may include one or more instances of content 103, invocation modules 120, or interfaces 170. Content 103 may include one or more instances of segments 108 or versions 109. Invocation module 120 may include one or more instances of associations 130, analysis modules 140, categories 141, 142, attributes 143, data 144, events 145, or feedback 147, 148. Association 130 may link one or more instances of parameters 131 with destinations 133 or other identifiers 134. Interface 170 may include one or more instances of input devices 171, output devices 172, ports 173, warnings 177, parameters 178, feedback 179, or other results 175.

With reference now to FIG. 2, there is shown a high-level logic flow 200 of an operational process. Flow 200 includes operation 260—obtaining one or more evaluation parameters in association with a message content destination selection (e.g. invocation module 120 receiving or creating an association 130 between parameter 131 and one or more destinations 133 or other identifiers 134). In some embodiments, for example, invocation module 120 may (optionally) be configured to create such associations in response to one or more instances of explicit recipient preference data 144, scheduling data or other recipient attributes 143, requests or similar events 145, delivery failures or other negative intermediary or recipient feedback 147 from prior delivery attempts of message content of the same category, transactions or other positive intermediary or recipient feedback 148 from prior deliveries of message content of the same category 142, analogous data arising from other recipients of the same destination category 141, or the like. See also U.S. patent application Ser. No. 11/821,122 ("Preliminary Destination-Dependent Evaluation of Message Content") filed 19 Jun. 2007, also by Jung et al., incorporated by reference herein to the extent not inconsistent herewith.

Flow 200 further includes operation 290—transmitting at least a tentative-message-content evaluation result from an application of the one or more evaluation parameters to tentative-message-content (e.g. interface 170 indicating one or more instances of rules, anomaly indicators, warnings 177, or other evaluation results 175 from one or more analysis modules 140, 190 applying the one or more parameters 131 to a tentative segment or other version 109 of content 103). Result 175 may (optionally) contain such a warning, for example, in response to an indication that such content is likely to be more favorably received if a creator of version 109 considers the warning. Executives, judges, teachers, or others who expect to receive voluminous documents may benefit by being able to specify such parameters proactively or to aggregate them over time to facilitate selective feedback 179 as an evaluation result of such tentative message content, for example. Such results may be available during a content editing or other drafting session, for example, while some or all such message content has not yet been authorized for transmission. In some variants, alternatively or additionally, a message composer may operate on a later segment of content with the benefit of a recipient status, a receipt status, or a feedback function update (of an analysis module, for example) resulting from sending an earlier segment of the content. In some variants, moreover, an analysis module may provide feedback relating to tentative content in relation to more than one recipient, such as by providing a result to the effect of "show contacts who would read this immediately," "sort by how much of this message will be read within two hours," or the like. Several other instances of configurations of analysis modules 140, 190 are described herein, for example, many of which are usable for ranking or other modes of selection across a variety of contacts, formats, content objects, or other such options.

With reference now to FIG. 3, shown is an example of a system that may serve as a context for introducing one or more processes and/or devices described herein. System 300 may be implemented as a stand-alone or distributed system, as exemplified herein. As shown system 300 includes one or more instances of evaluation modules 330; processors 344, 346; sensors 348 effectively operable for receiving authorizations 347; or interfaces 350. Each valuation module 330 may include one or more instances of mode selection logic 301; content 310; invocation modules 311; code 312; updates 313; controllers 314, 324; functions 316, 317; aggregators 321; prediction logic 326 effectively operable for providing indications 327; aggregations 331; or destination lists 336 of one or more destinations 337, 338, 339. Each mode selection logic 301 may include one or more instances of modes 303, 304, 305, 306 of which one or more modes may include one or more rules 308, 309. Each aggregation 331 may include one or more instances of items 332, parameters 333, or event indicators 334, 335. Each interface 350 may include one or more instances of input devices 359, output devices 360, displays 365 each operable for displaying one or more images 367, or results 389. Each keyboard, pointing device, microphone, image capture device, or other input device 359 may include one or more instances of user actions 352, security data 354, identifiers 356, or other entries 357 such as those described herein. Each output device may similarly include one or more descriptors 362. Each result may include one or more instances of predictive information 381, object identifiers 382, verbal information 383 or other information 385, advice 386, feedback 387, levels 388 or the like. Any such components may, of course, include other components such as those shown in FIGS. 4-13 and described below.

Figure 4:
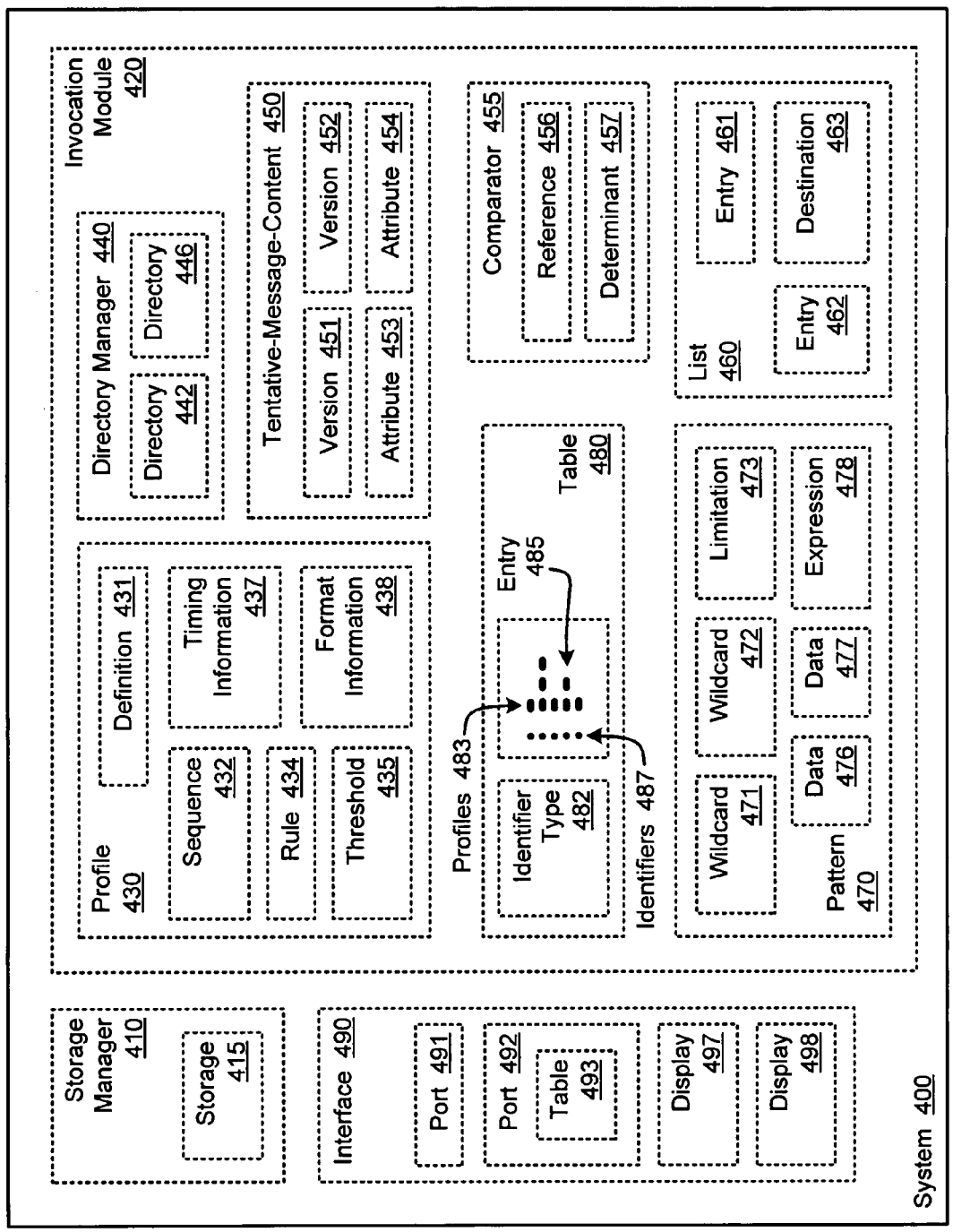

With reference now to FIG. 4, shown is an example of a system that may serve as a context for introducing one or more processes and/or devices described herein. System 400 may be implemented as a stand-alone or distributed system, as exemplified herein. As shown system 400 includes one or more instances of storage managers 410 operable for handling media as described herein (such as storage 415, for example), invocation modules 420, or interfaces 490. Each invocation module 420 may include one or more instances of profiles 430, directory managers 440, tentative-message-content 450, comparators 455, lists 460, patterns 470, or tables 480. Each profile 430 may include one or more instances of definitions 431, sequences 432, rules 434, thresholds 435, timing information 437, or format information 438. Directory manager 440 may access or otherwise include one or more directories 442, 446. Tentative-message-content 450 may include one or more instances of versions 451, 452 or attributes 453, 454. Each comparator 455 may include one or more instances of references 456 or other determinants 457. Each list 460 may include one or more instances of entries 461, 462 or destinations 463. Each pattern 470 may include one or more instances of wildcards 471, 472; limitations 473; data 476, 477; or expressions 478. Each table 480 may include one or more instance of identifier types 482 or profiles 483 associated with respective identifiers 487, for example, by inclusion in a common entry 485 as shown. Each interface 490 may include one or more instances of ports 491, 492 (optionally operable for handling table 493, for example) or displays 497, 498. Further information is provided below, especially with reference to FIGS. 14-15. Any such components may, of course, include other components such as those shown in FIGS. 5-13 and described below.

Figure 5:
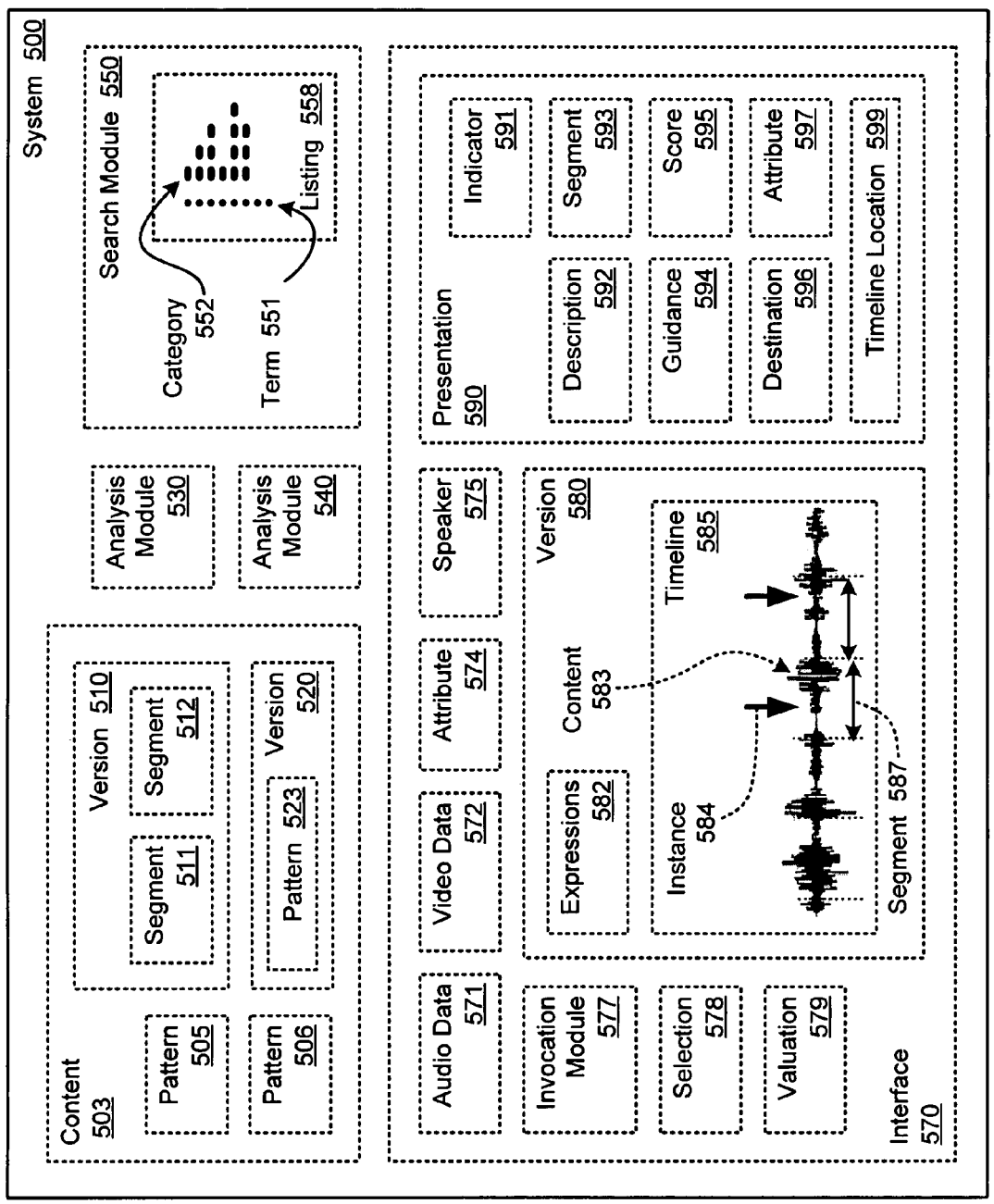

With reference now to FIG. 5, shown is an example of a system that may serve as a context for introducing one or more processes and/or devices described herein. System 500 may be implemented as a stand-alone or distributed system, as exemplified herein. As shown system 500 includes one or more instances of content 503; search modules 550 or other analysis modules 530, 540; or interfaces 570. Each instance of content 503 may include one or more instances of patterns 505, 506 or versions 510, 520. Each version 510 may include one or more segments 511, 512 and/or each version 520 may include one or more instances of patterns 523. Each search module 550 may include one or more instances of listings 558 mapping one or more terms 551 with one or more respective categories 552. Each interface 570 may include one or more instances of audio data 571, video data 572, attributes 574, speakers 575, invocation modules 577, selections 578, valuations 579, versions 580, or presentations 590. Each version 580 may include one or more instances of expressions 582 or timelines 585. Each timeline 585 may include one or more instances 584 (of expression 582 or other patterns, for example) within content 583 across a succession of time segments 587. Each presentation 590 may include one or more instances of indicators 591, descriptions 592, segments 593, guidance 594, scores 595, destinations 596, attributes 597, or timeline locations 599. Further information is provided below, especially with reference to FIGS. 14-15. Any such components may, of course, include other components such as those shown in FIGS. 6-13 and described below.

Figure 6:
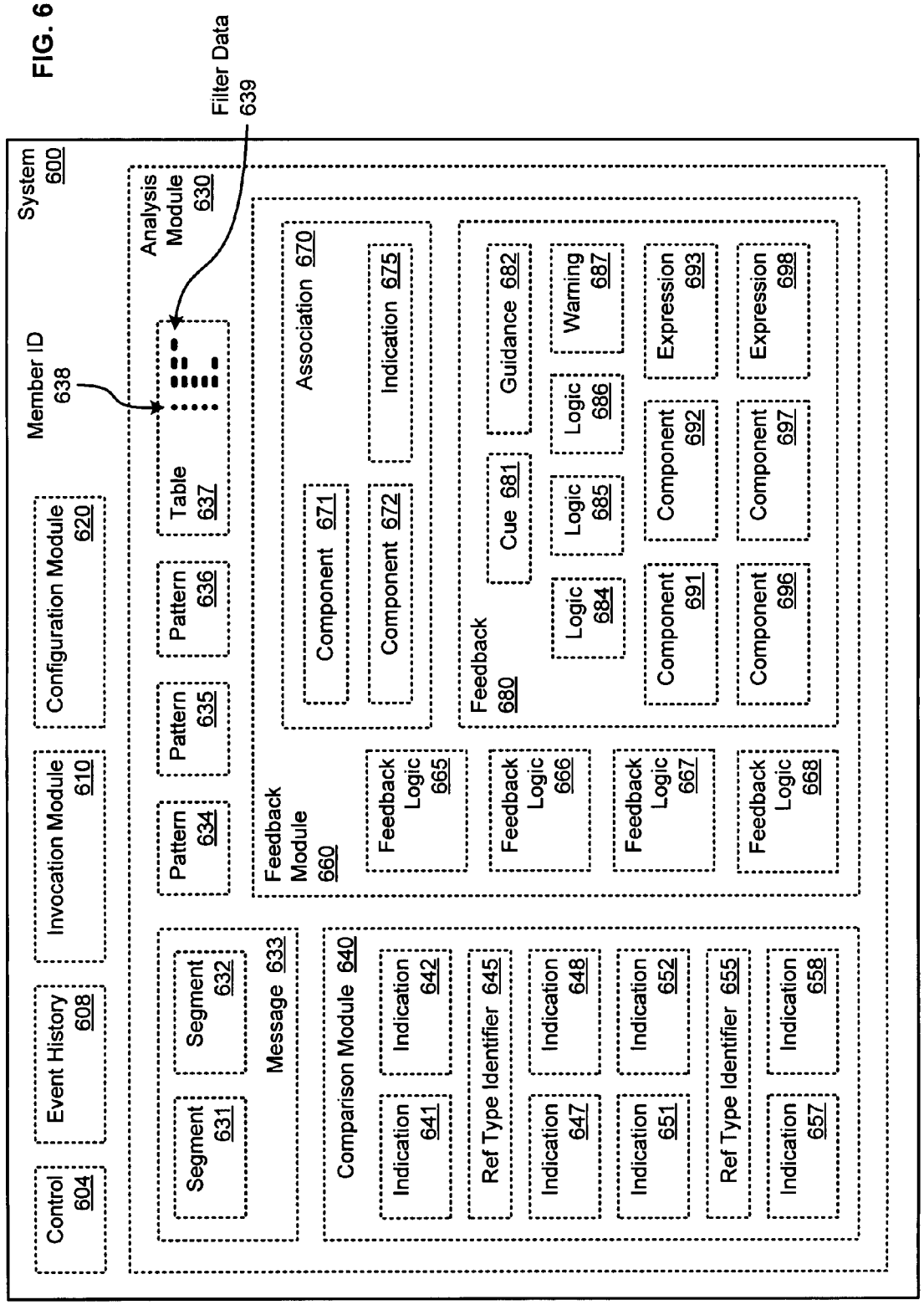

With reference now to FIG. 6, shown is an example of a system that may serve as a context for introducing one or more processes and/or devices described herein. System 600 may be implemented as a stand-alone or distributed system, as exemplified herein. As shown system 600 includes one or more instances of controls 604, event histories 608, invocation modules 610, configuration modules 620, or analysis modules 630. Each analysis module 630 may include one or more instances of messages 633 each in one or more segments 631, 632; patterns 634, 635, 636; tables 637 (mapping one or more member identifiers 638 respectively to filter data 639, for example); comparison modules 640; or feedback modules 660. Each comparison module 640 may include one or more instances of indications 641, 642, 647, 648, 651, 652, 657, 658 or reference type identifiers 645, 655. Each feedback module 660 may include one or more instances of feedback logic 665, 666, 667, 668; associations 670; or feedback 680. Each association 670 may map one or more instances of components 671, 672 with one or more respective indications 675, for example. Each instance of feedback 680 may include one or more instances of cues 681, guidance 682; logic 684, 685, 686; warnings 687; components 691, 692, 696, 697; or expressions 693, 698. Any such components may, of course, include other components such as those shown in FIGS. 7-13 and described below.

Figure 7:
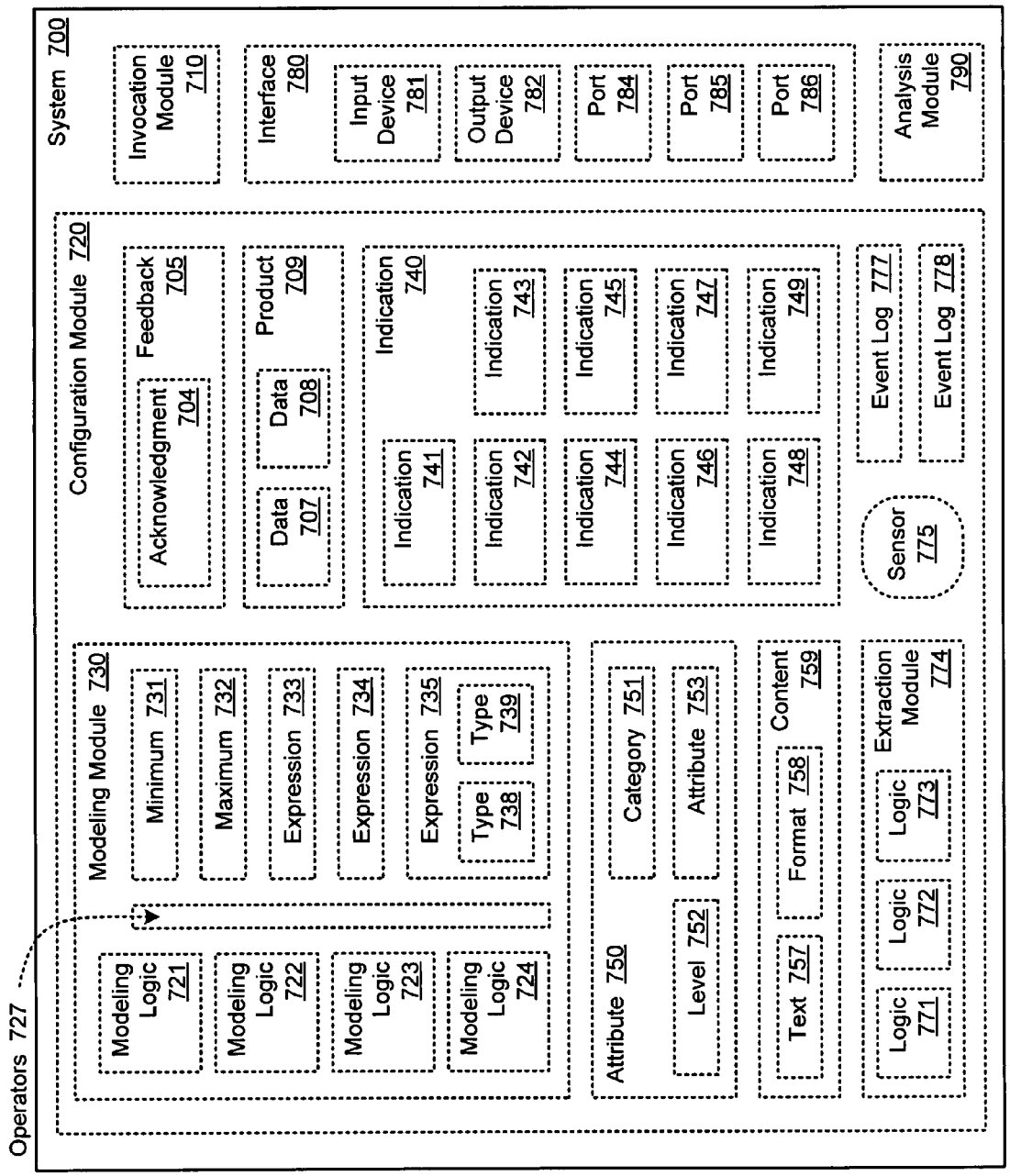

With reference now to FIG. 7, shown is an example of a system that may serve as a context for introducing one or more processes and/or devices described herein. System 700 may be implemented as a stand-alone or distributed system, as exemplified herein. As shown system 700 includes one or more instances of invocation modules 710, configuration modules 720, interfaces 780, or analysis modules 790. Each configuration module 720 may include one or more instances of acknowledgements 704 or other feedback 705; data 707, 708 or other products 709; modeling modules 730; indications 741, 742, 743, 744, 745, 746, 747, 748, 749 as described herein, within or among indications 740; categories 751, levels 752, or other attributes 753 within or among attributes 750; text 757, formats 758, or other content 759; extraction logic 771, 772, 773 of extraction modules 774, sensors 775, or event logs 777, 778. Each modeling module 730 may include one or more instances of modeling logic 721, 722, 723, 724; operators 727; minima 731; maxima 732; expressions 733, 734, 735 such as one or more types 738, 739. Each interface 780 may include one or more instances of input devices 781; output devices 782; or ports 784, 785, 786. Any such components may, of course, include other components such as those shown in FIGS. 8-13 and described below.

Figure 8:
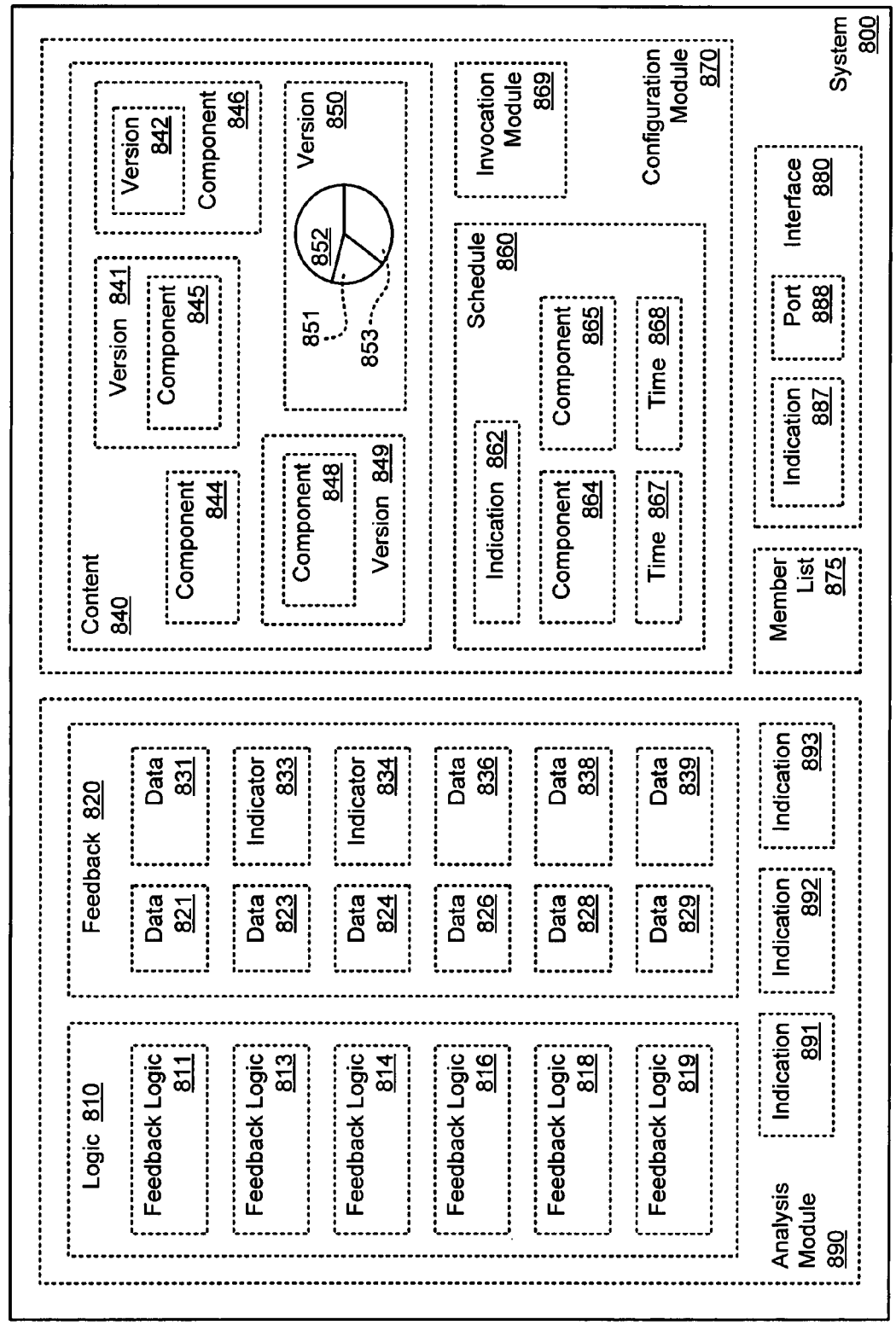

With reference now to FIG. 8, shown is an example of a system that may serve as a context for introducing one or more processes and/or devices described herein. System 800 may be implemented as a stand-alone or distributed system, as exemplified herein. As shown system 800 includes one or more instances of configuration modules 870, member lists 875, interfaces 880, or analysis modules 890. Each configuration module 870 may include one or more instances of content 840, schedules 860, or invocation modules 869. Each instance of content 840 may include one or more instances of versions 841, 842, 849, 850 or components 844, 845, 846, 848, 851, 852, 853. Each schedule 860 may include one or more instances of indications 862; components 864, 865; or times 867, 868. Each interface 880 may include one or more instances of indications 887 or ports 888. Each analysis module 890 may include one or more instances of feedback logic 811, 813, 814, 816, 818, 819 within or among logic 810; data 821, 823, 824, 826, 828, 829, 831, 836, 838, 839 or indicators 833, 834 within or among feedback 820; or indications 891, 892, 893. Any such components may, of course, include other components such as those shown in FIGS. 9-13 and described below.

Figure 9:
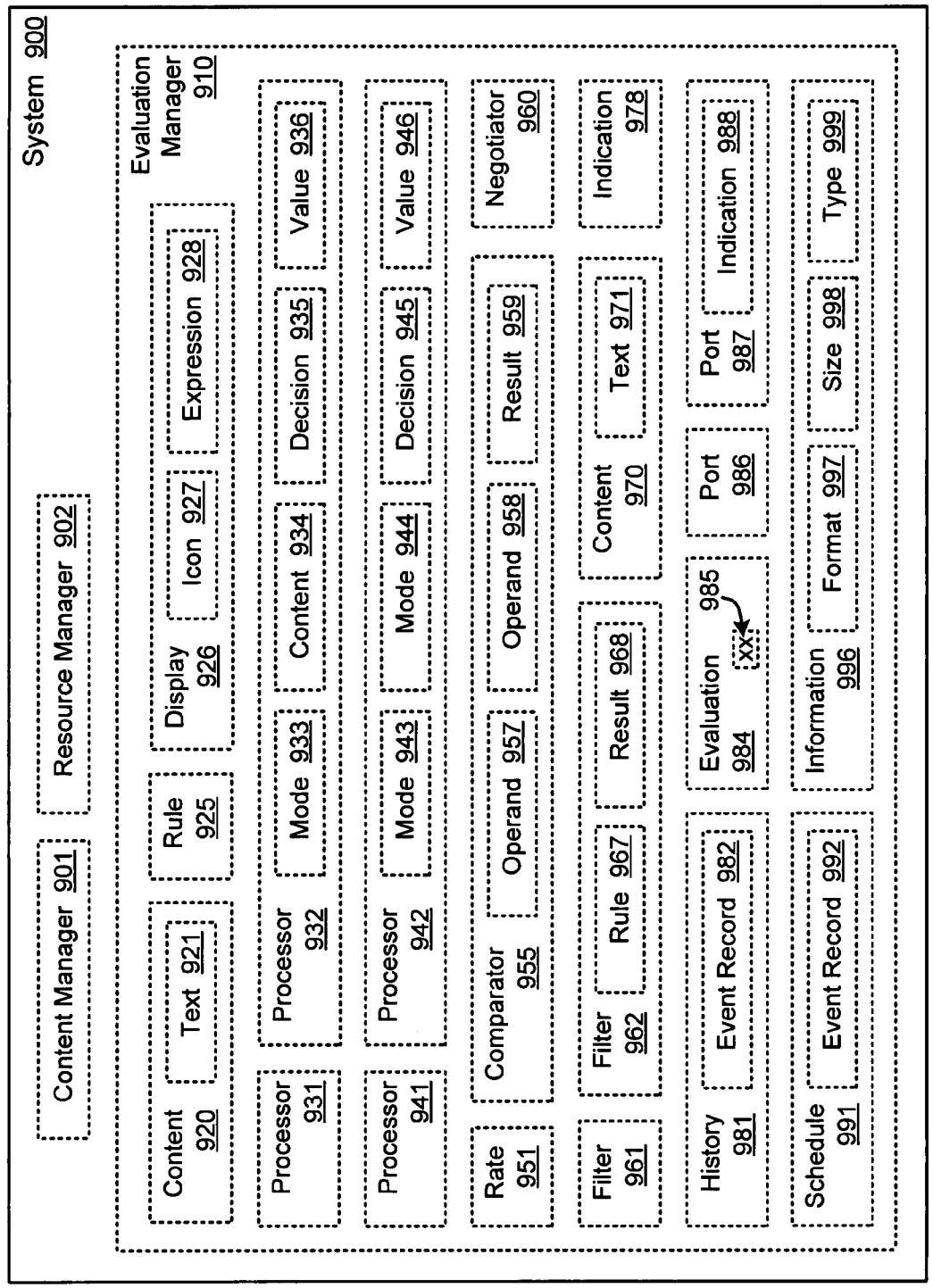

With reference now to FIG. 9, shown is an example of a system that may serve as a context for introducing one or more processes and/or devices described herein. System 900 may be implemented as a stand-alone or distributed system, as exemplified herein. As shown system 900 includes one or more instances of content managers 901, resource managers 902, or evaluation managers 910. Each evaluation manager 910 may include one or more instances of text 921, 971 or other content 920, 970; rules 925; displays 926; processors 931, 932, 941, 942; rates 951, comparators 955, negotiators 960; filters 961, 962; indications 978; event records 982 or other elements of histories 981; scores 985 or other evaluations 984; ports 986, 987 operable for handling one or more indications 988; event records 992 or other elements of schedules 991; or information 996. Each display 926 may include one or more instances of icons 927 or other expressions 928. Each processor 932, 942 may include one or more instances of modes 933, 943, 944; content 934; decisions 935, 945; or other values 936, 946. Each comparator 955 may compare two or more instances of operands 957, 958 to generate one or more results 959. Each filter 962 may include one or more instances of rules 967 or results 968. Each instance of information 996 may include one or more instances of formats 997, sizes 998, or types 999. Any such components may, of course, include other components such as those shown in FIGS. 10-13 and described below.

Figure 10:
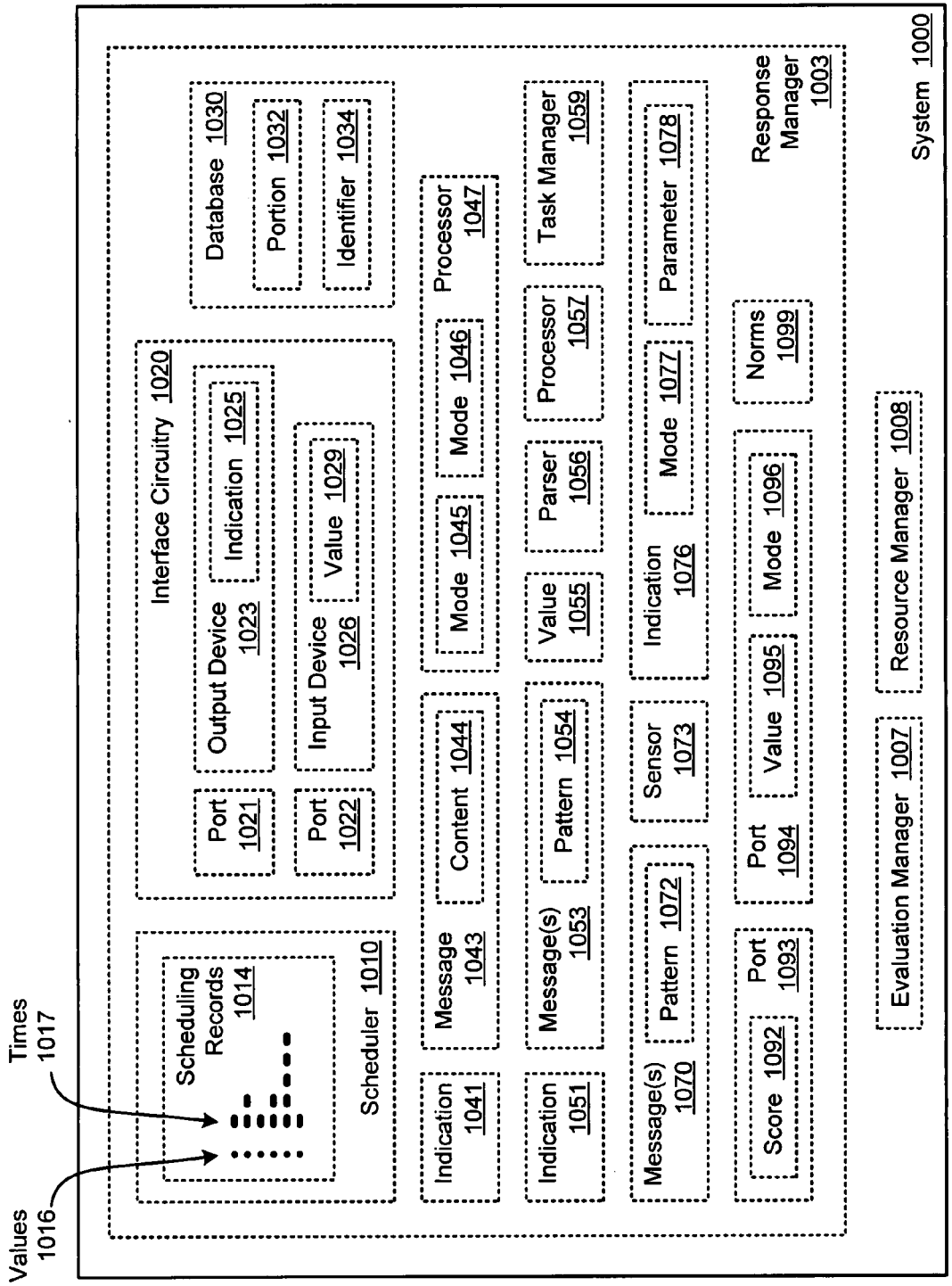

With reference now to FIG. 10, shown is an example of a system that may serve as a context for introducing one or more processes and/or devices described herein. System 1000 may be implemented as a stand-alone or distributed system, as exemplified herein. As shown system 1000 may include one or more instances of response managers 1003, evaluation managers 1007, or resource managers 1008. Each response manager 1003 may likewise include one or more instances of schedulers 1010; interface circuitry 1020; databases 1030; indications 1041, 1051; messages 1043 containing content 1044; patterns 1054 or other message(s) 1053; messages 1070 containing one or more instances of patterns 1072; values 1055; parsers 1056; processors 1047, 1057 (optionally operable for using two or more modes 1045, 1046); task managers 1059; sensors 1073; modes 1077, parameters 1078, or other indications 1076; ports 1093, 1094 operable for handling one or more scores 1092, values 1095, or modes 1096; or norms 1099. Each scheduler 1010 may include one or more event descriptors or other such values 1016 associated with one or more corresponding times 1017, such as by inclusion in one or more common scheduling records 1014. Each instance of interface circuitry 1020 may include one or more instances of ports 1021, 1022; output devices 1023 operable for transmitting indications 1025; or input devices 1026 operable for receiving values 1029. Database 1030 may comprise one or more portions 1032, identifiers 1034, or the like as described herein. Further information is provided below, especially with reference to FIGS. 14&15. Any such components may, of course, include other components such as those shown in FIGS. 11-13 and described below.

Figure 11:
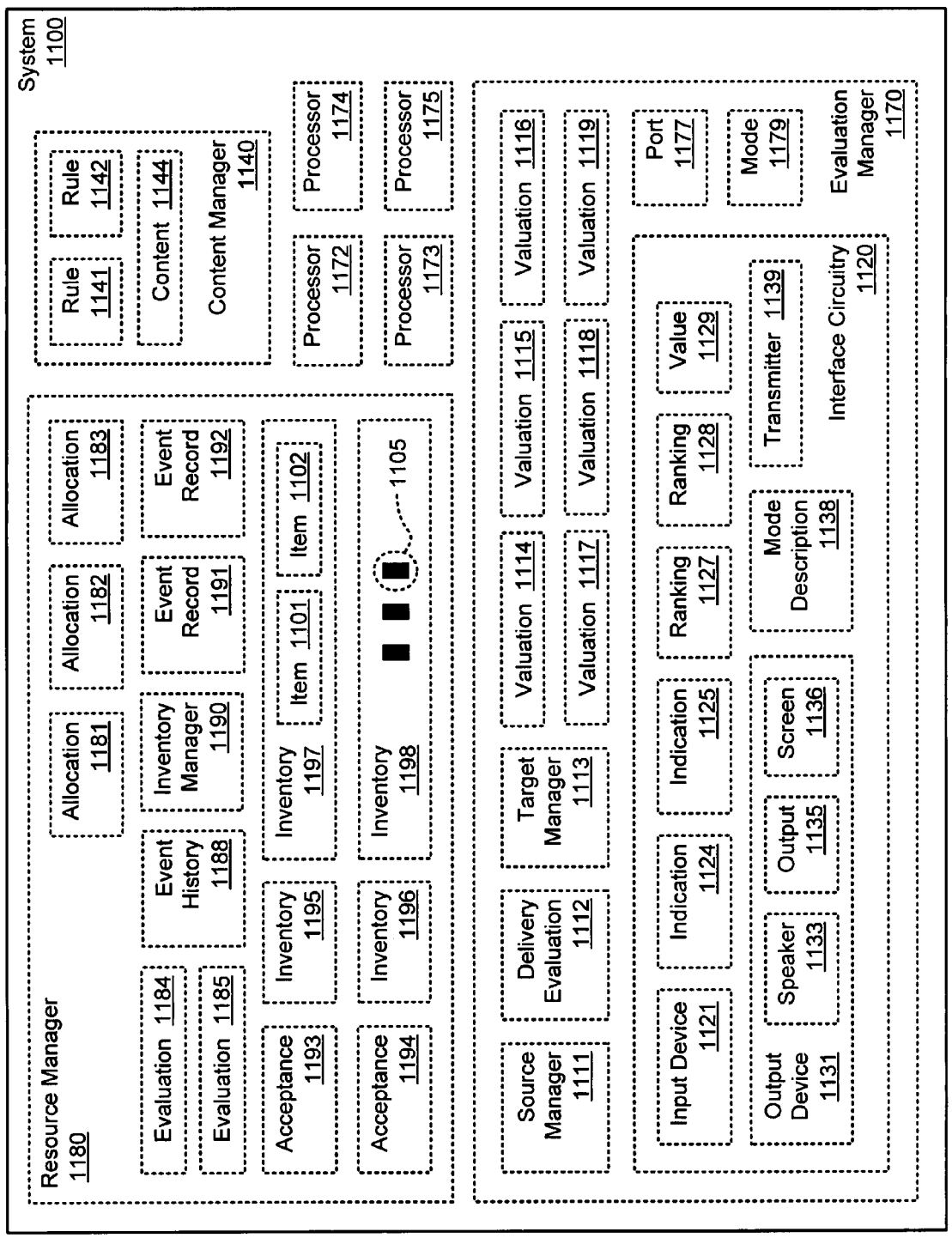

With reference now to FIG. 11, shown is an example of a system that may serve as a context for introducing one or more processes and/or devices described herein. System 1100 may be implemented as a stand-alone or distributed system, as exemplified herein. As shown system 1100 includes one or more instances of content managers 1140 operable for handling rules 1141, 1142 or content 1144; evaluation managers 1170; processors 1172, 1173, 1174, 1175; or resource managers 1180. Each evaluation manager 1170 includes one or more instances of source managers 1111; delivery evaluations 1112; target managers 1113; valuations 1114, 1115, 1116, 1117, 1118, 1119; interface circuitry 1120; ports 1177; or modes 1179. Each interface circuitry 1120 includes one or more instances of input devices 1121; indications 1124, 1125; rankings 1127, 1128; values 1129; outputs 1136 handled by one or more instances of speakers 1133, screens 1135, or other output devices 1131; mode descriptions 1138; or transmitters 1139. Each resource manager 1180 includes one or more instances of allocations 1181, 1182, 1183; evaluations 1184, 1185; event histories 1188; inventory managers 1190; event records 1191, 1192; acceptances 1193, 1194; inventories 1195, 1196, 1197, 1198 able to hold increments 1105 or other items 1101, 1102. Any such components may, of course, include other components such as those shown in FIGS. 12-13 and described below.

Figure 12:
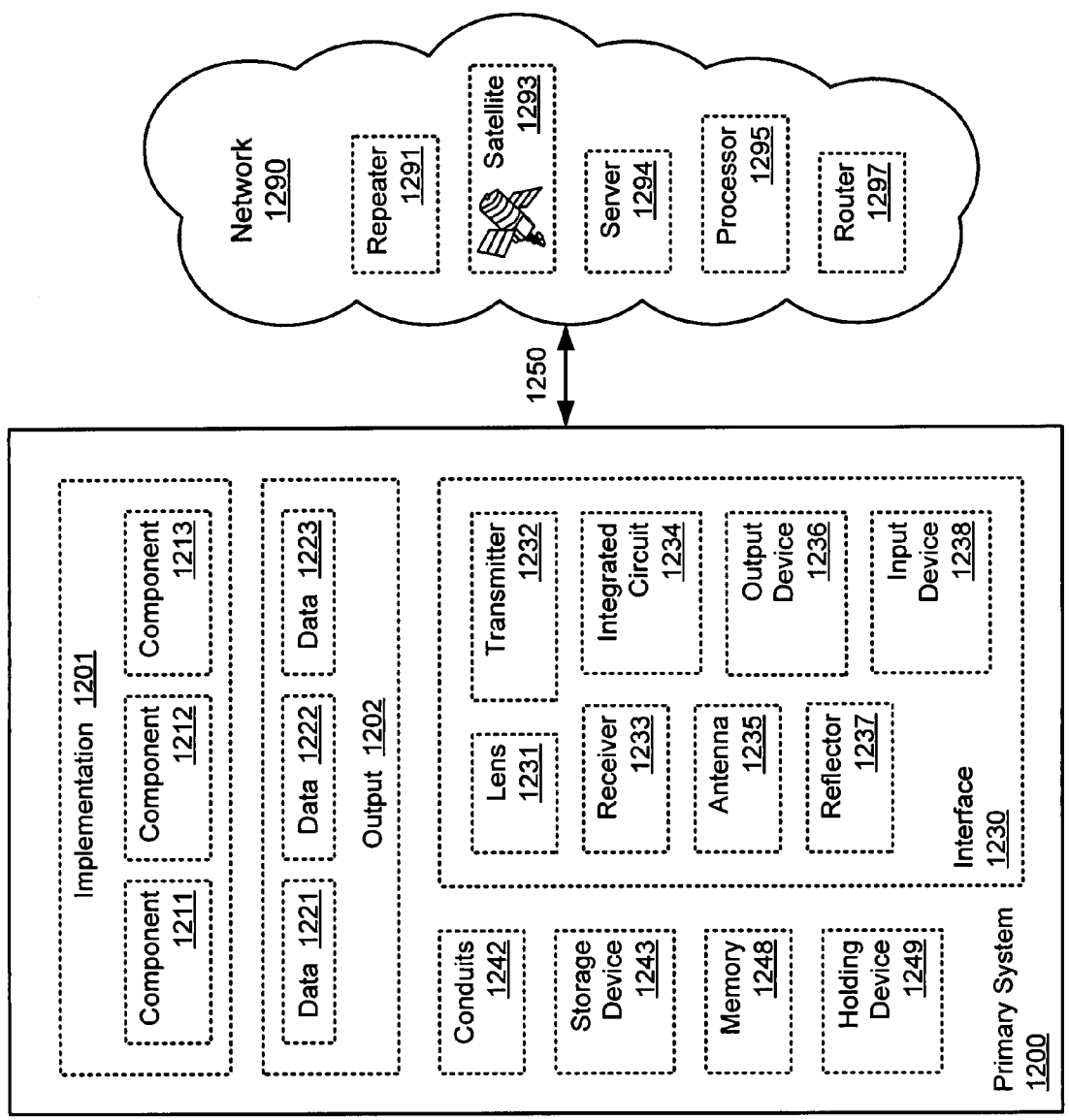

With reference now to FIG. 12, shown is an example of a system that may serve as a context for introducing one or more processes, systems or other articles described herein. Primary system 1200 may include one or more instances of implementations 1201 or outputs 1202 that may be held or transmitted by interfaces 1230, conduits 1242, storage devices 1243, memories 1248, or other holding devices 1249 or the like. In various embodiments as described herein, for example, one or more instances of implementation components 1211, 1212, 1213 or implementation output data 1221, 1222, 1223 may each be expressed in any aspect or combination of software, firmware, or hardware as signals, data, designs, logic, instructions, or the like. The interface(s) 1230 may include one or more instances of lenses 1231, transmitters 1232, receivers 1233, integrated circuits 1234, antennas 1235, output devices 1236, reflectors 1237, input devices 1238, or the like for handling data or communicating with local users or with network 1290 via linkage 1250, for example. Several variants of primary system 1200 are described below with reference to one or more instances of repeaters 1291, communication satellites 1293, servers 1294, processors 1295, routers 1297, or other elements of network 1290.

Those skilled in the art will recognize that some list items may also function as other list items. In the above-listed types of media, for example, some instances of interface(s) 1230 may include conduits 1242, or may also function as storage devices that are also holding devices 1249. One or more transmitters 1232 may likewise include input devices or bidirectional user interfaces, in many implementations of interface(s) 1230. Each such listed term should not be narrowed by any implication from other terms in the same list but should instead be understood in its broadest reasonable interpretation as understood by those skilled in the art.

Several variants described herein refer to device-detectable "implementations" such as one or more instances of computer-readable code, transistor or latch connectivity layouts or other geometric expressions of logical elements, firmware or software expressions of transfer functions implementing computational specifications, digital expressions of truth tables, or the like. Such instances can, in some implementations, include source code or other human-readable portions. Alternatively or additionally, functions of implementations described herein may constitute one or more device-detectable outputs such as decisions, manifestations, side effects, results, coding or other expressions, displayable images, data files, data associations, statistical correlations, streaming signals, intensity levels, frequencies or other measurable attributes, packets or other encoded expressions, or the like from invoking or monitoring the implementation as described herein.

Referring again to FIG. 2, flow 200 may be performed by one or more instances of server 1294 remote from primary system 1200, for example, but operable to cause output device(s) 1236 to receive and present results via linkage 1250. Alternatively or additionally, device-detectable data 1222 may be borne by one or more instances of signal-bearing conduits 1242, holding devices 1249, integrated circuits 1234, or the like as described herein. Such data may optionally be configured for transmission by a semiconductor chip or other embodiment of integrated circuit 1234 that contains or is otherwise operatively coupled with antenna 1235 (in a radio-frequency identification tag, for example).

In some variants, some instances of flow 200 may be implemented entirely within primary system 1200, optionally configured as a stand-alone system. Operation 260 may be implemented by configuring component 1211 as logic for obtaining one or more evaluation parameters in association with a message content destination selection, for example. This can be accomplished by including special-purpose instruction sequences or special-purpose-circuit designs for this function, for example, in optical or other known circuit fabrication operations, in programming by various known voltage modulation techniques, or otherwise as described herein or known by those skilled in the art. Output data 1221 from such a component in primary system 1200 or network 1290 may be recorded by writing to or otherwise configuring available portions of storage device(s) 1243.

Alternatively or additionally, such specific output data may be transmitted by configuring transistors, relays, or other drivers or conduits 1242 of primary system 1200 to transfer it to component 1212, for example. Component 1212 may perform operation 290 via implementation as logic for transmitting at least a tentative-message-content evaluation result from an application of the one or more evaluation parameters to tentative-message-content, for example. Implementation output data 1222 from such a component in primary system 1200 or network 1290 may be recorded into available portions of storage device(s) 1243 or sent to component 1213, for example. Output 1202 from flow 200 may likewise include other data 1223 as described herein.

In some embodiments, output device 1236 may indicate an occurrence of flow 200 concisely as a decision, an evaluation, an effect, an hypothesis, a probability, a notification, or some other useful technical result. For example, such "indicating" may comprise such modes as showing, signifying, acknowledging, updating, explaining, associating, or the like in relation to any past or ongoing performance of such actions upon the common item(s) as recited. Such indicating may also provide one or more specifics about the occurrence: the parties or device(s) involved, a description of the method or performance modes used, any sequencing or other temporal aspects involved, indications of resources used, location(s) of the occurrence, implementation version indications or other update-indicative information, or any other such contextual information that may be worthwhile to provide at potential output destinations.

Concise indication may occur, for example, in a context in which at least some items of data 1221-1223 do not matter, or in which a recipient may understand or access portions of data 1221-1223 without receiving a preemptive explanation of how it was obtained. By distilling at least some output 1202 at an "upstream" stage (which may comprise integrated circuit 1234, for example, in some arrangements), downstream-stage media (such as other elements of network 1290, for example) may indicate occurrences of various methods described herein more effectively. Variants of flow 200, for example, may be enhanced by distillations described herein, especially in bandwidth-limited transmissions, security-encoded messages, long-distance transmissions, complex images, or compositions of matter bearing other such expressions.

In some variants, a local implementation comprises a service operable for accessing a remote system running a remote implementation. In some embodiments, such "accessing" may include one or more instances of establishing or permitting an interaction between the server and a local embodiment such that the local embodiment causes or uses another implementation or output of one or more herein-described functions at the server. Functioning as a web browser, remote terminal session, or other remote activation or control device, for example, interface(s) 1230 may interact with one or more primary system users via input and output devices 1236, 1238 so as to manifest an implementation in primary system 1200 via an interaction with server 1294, for example, running a secondary implementation of flow 200. Such local implementations may comprise a visual display supporting a local internet service to the remote server, for example. Such a remote server may control or otherwise enable one or more instances of hardware or software operating the secondary implementation outside a system, network, or physical proximity of primary system 1200. For a building implementing primary system 1200, for example, "remote" devices may include those in other countries, in orbit, or in adjacent buildings. In some embodiments, "running an implementation" may include invoking one or more instances of software, hardware, firmware, or the like atypically constituted or adapted to facilitate methods or functions as described herein. For example, primary system 1200 running an implementation of flow 200 may be a remote activation of a special-purpose computer program resident on server 1294 via an internet browser session interaction through linkage 1250, mediated by input device 1238 and output device 1236.

In some variants, some or all of components 1211-1213 may be borne in various data-handling elements—e.g., in one or more instances of storage devices 1243, in memories 1248 or volatile media, passing through linkage 1250 with network 1290 or other conduits 1242, in one or more registers or data-holding devices 1249, or the like. For example, such processing or configuration may occur in response to user data or the like received at input device 1238 or may be presented at output device 1236. Instances of input devices 1238 may (optionally) include one or more instances of cameras or other optical devices, hand-held systems or other portable systems, keypads, sensors, or the like as described herein. Output device(s) 1236 may likewise include one or more instances of image projection modules, touch screens, wrist-wearable systems or the like adapted to be worn while in use, headphones and speakers, eyewear, liquid crystal displays (LCDs), actuators, lasers, organic or other light-emitting diodes, phosphorescent elements, portions of (hybrid) input devices 1238, or the like.

A device-detectable implementation of variants described herein with reference to flow 200, for example, may be divided into several components 1211-1213 carried by one or more instances of active modules such as signal repeaters 1291, communication satellites 1293, servers 1294, processors 1295, routers 1297, or the like. For example, in some embodiments, component 1212 may be borne by an "upstream" module (e.g., repeater 1291 or the like) while or after component 1211 is borne in a "downstream" module (e.g., another instance of repeater 1291, communication satellite 1293, server 1294, or the like). Such downstream modules may "accept" such bits or other portions of implementation 1201 sequentially, for example, such as by amplifying, relaying, storing, checking, or otherwise processing what was received actively. Sensors and other "upstream" modules may likewise "accept" raw data, such as by measuring physical phenomena or accessing one or more databases.

In some embodiments, a medium bearing data (or other such event) may be "caused" (directly or indirectly) by one or more instances of prior or contemporaneous measurements, decisions, transitions, circumstances, or other causal determinants. Any such event may likewise depend upon one or more other prior, contemporaneous, or potential determinants, in various implementations as taught herein. In other words, such events may occur "in response" to both preparatory (earlier) events and triggering (contemporaneous) events in some contexts. Output 1202 may result from more than one component of implementations 1201 or more than one operation of flow 200, for example.

In some embodiments, such integrated circuits 1234 may comprise transistors, capacitors, amplifiers, latches, converters, or the like on a common substrate of a semiconductor material, operable to perform computational tasks or other transformations. An integrated circuit may be application-specific ("ASIC") in that it is designed for a particular use rather than for general purpose use. An integrated circuit may likewise include one or more instances of memory circuits, processors, field-programmable gate arrays (FPGA's), antennas, or other components, and may be referred to as a system-on-a-chip ("SoC").

In some embodiments, one or more instances of integrated circuits or other processors may be configured to perform auditory pattern recognition. In FIG. 12, for example, instances of the one or more input devices 1238 may include a microphone or the like operable to provide auditory samples in data 1221-1223. Some form or portion of such output may be provided remotely, for example, to one or more instances of neural networks or other configurations of remote processors 1295 operable to perform automatic or supervised speech recognition, selective auditory data retention or transmission, or other auditory pattern recognition, upon the samples. Alternatively or additionally such sound-related data may include annotative information relating thereto such as a capture time or other temporal indications, capture location or other source information, language or other content indications, decibels or other measured quantities, pointers to related data items or other associative indications, or other data aggregations or distillations as described herein.

In some embodiments, one or more instances of integrated circuits or other processors may be configured for optical image pattern recognition. In FIG. 12, for example, instances of lenses 1231 or other input devices 1238 may include optical sensors or the like operable to provide one or more of geometric, hue, or optical intensity information in data 1221-1223. Some form or portion of such output may be provided locally, for example, to one or more instances of optical character recognition software, pattern recognition processing resources, or other configurations of integrated circuits 1234 operable to perform automatic or supervised image recognition, selective optical data retention or transmission, or the like. Alternatively or additionally such image-related data may include annotative information relating thereto such as a capture time or other temporal indications, capture location or other source information, language or other content indications, pointers to related data items or other associative indications, or other data aggregations or distillations as described herein.

In some embodiments, one or more instances of integrated circuits or other processors may be configured to perform linguistic pattern recognition. In FIG. 1, for example, instances of input devices 1238 may include keys, pointing devices, microphones, sensors, reference data, or the like operable to provide spoken, written, or other symbolic expressions in data 1221-1223. Some form or portion of such output may be provided locally, for example, to one or more instances of translation utilities, compilers, or other configurations of integrated circuits 1234 operable to perform automatic or supervised programming or other language recognition, selective linguistic data retention or transmission, or the like. Alternatively or additionally such language-related data may include annotative information relating thereto such as a capture time or other temporal indications, capture location or other source information, language or other content indications, pointers to related data items or other associative indications, or other data classifications, aggregations, or distillations as described herein.

In some embodiments, one or more antennas 1235 or receivers 1233 may include a device that is the receiving end of a communication channel as described herein. For example, such a receiver may gather a signal from a dedicated conduit or from the environment for subsequent processing and/or retransmission. As a further example, such antennas or other receivers may include one or more instances of wireless antennas, radio antennas, satellite antennas, broadband receivers, digital subscriber line (DSL) receivers, modem receivers, transceivers, or configurations of two or more such devices for data reception as described herein or otherwise known.

In one variant, two or more respective portions of output data 1221-1223 may be sent from server 1294 through respective channels at various times, one portion passing through repeater 1291 and another through router 1297. Such channels may each bear a respective portion of a data aggregation or extraction, a publication, a comparative analysis or decision, a record selection, digital subscriber content, statistics or other research information, a resource status or potential allocation, an evaluation, an opportunity indication, a test or computational result, or some other output 1202 of possible interest. Such distributed media may be implemented as an expedient or efficient mode of bearing such portions of output data to a common destination such as interface 1230 or holding device 1249. Alternatively or additionally, some such data may be transported by moving a medium (carried on storage device 1243, for example) so that only a small portion (a purchase or other access authorization, for example, or a contingent or supplemental module) is transferred via linkage 1250.

In some embodiments, one or more instances of signal repeaters 1291 may include a device or functional implementation that receives a signal and transmits some or all of the signal with one or more of an altered strength or frequency, or with other modulation (e.g., an optical-electrical-optical amplification device, a radio signal amplifier or format converter, a wireless signal amplifier, or the like). A repeater may convert analog to digital signals or digital to analog signals, for example, or perform no conversion. Alternatively or additionally, a repeater may reshape, retime or otherwise reorder an output for transmission. A repeater may likewise introduce a frequency offset to an output signal such that the received and transmitted frequencies are different. A repeater also may include one or more instances of a relay, a translator, a transponder, a transceiver, an active hub, a booster, a noise-attenuating filter, or the like.

In some embodiments, such communication satellite(s) 1293 may be configured to facilitate telecommunications while in a geosynchronous orbit, a Molniya orbit, a low earth orbit, or the like. Alternatively or additionally, a communication satellite may receive or transmit, for example, telephony signals, television signals, radio signals, broadband telecommunications signals, or the like.

Figure 14:
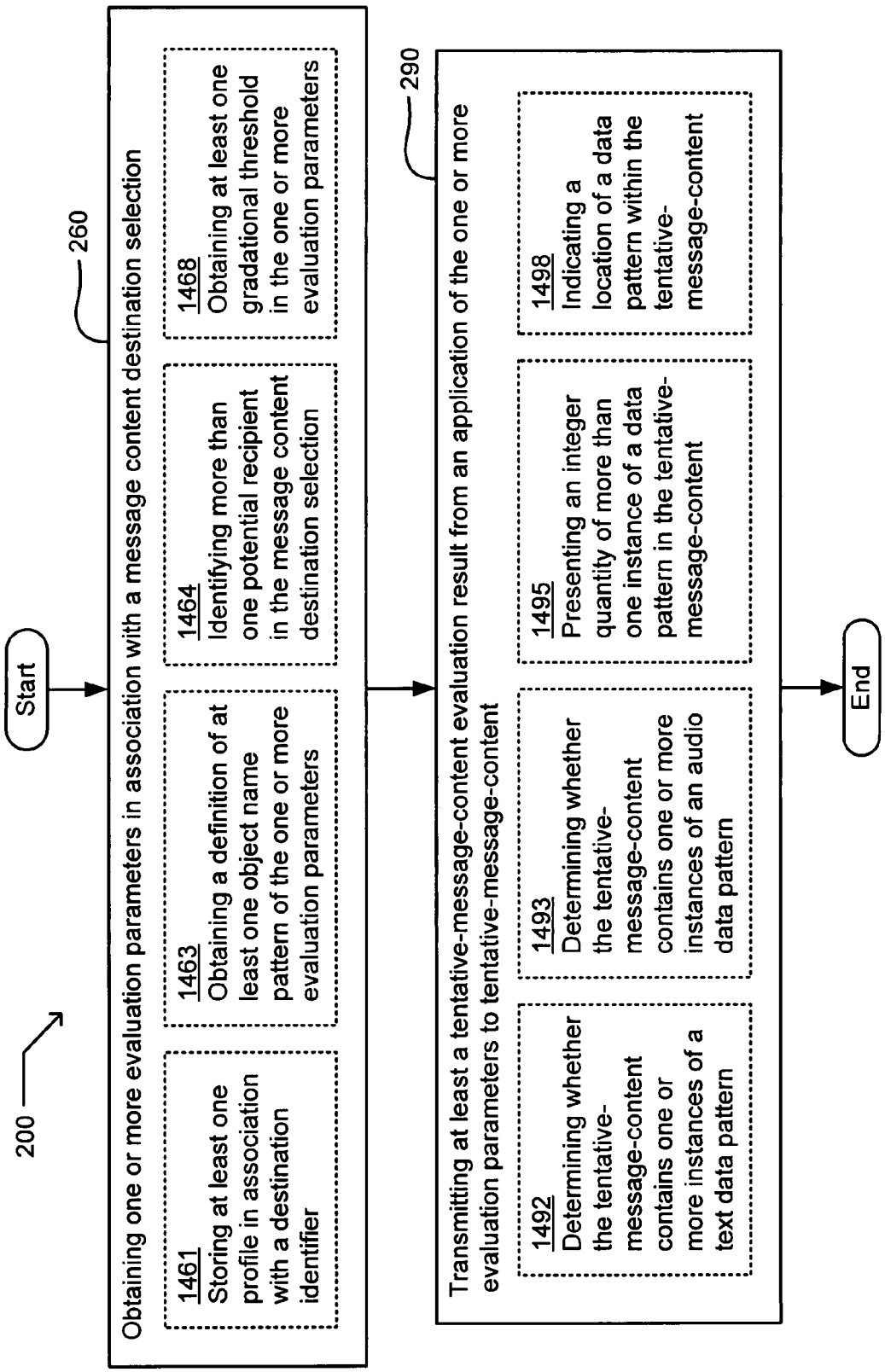
FIGS. 14-15 depict variants of the flow of FIG. 2.
Figure 15:
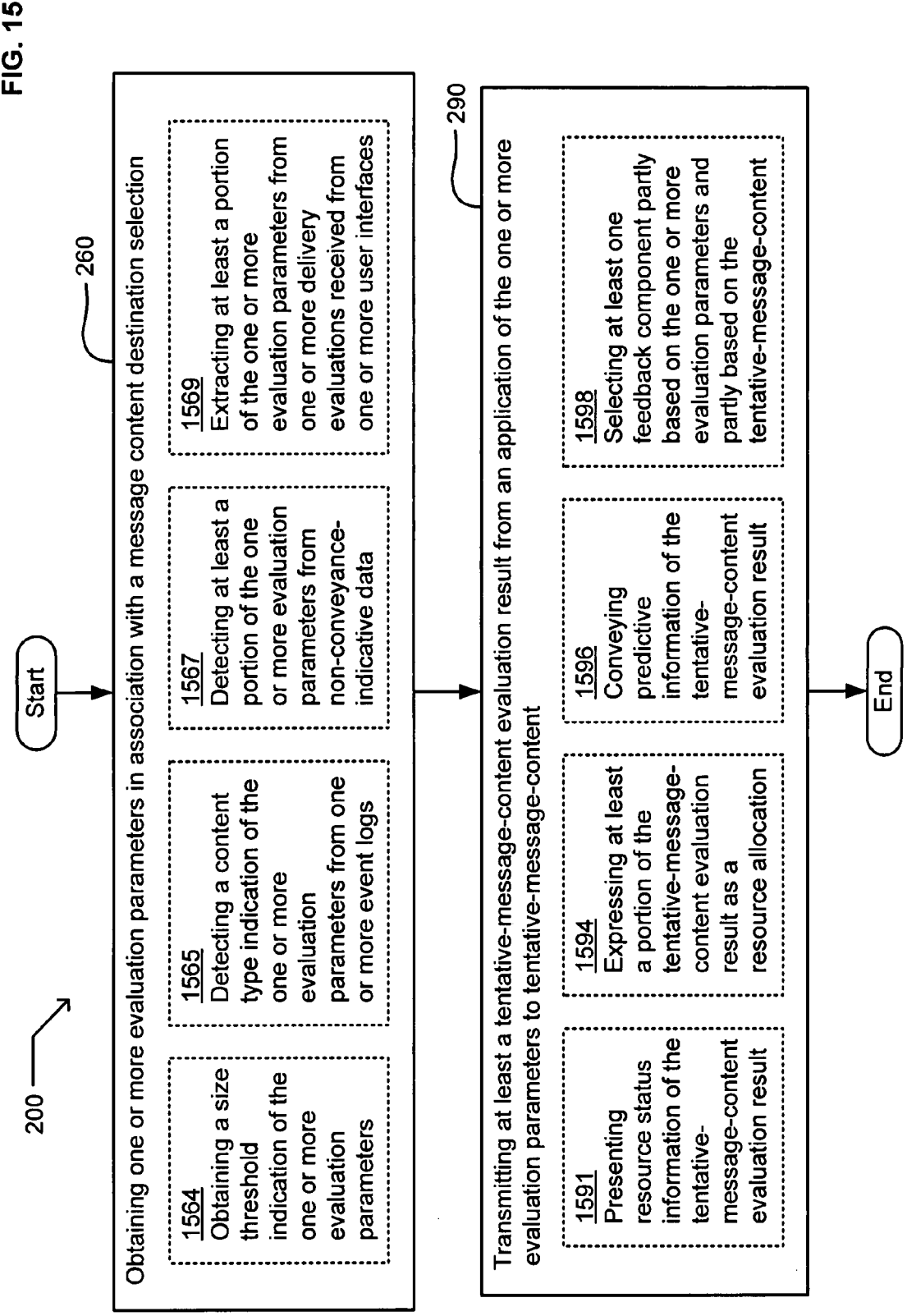

In some variants, processor 1295 or any components 1211-1213 of implementations 1201 may (optionally) be configured to perform flow variants as described herein with reference to FIGS. 14&15. An occurrence of such a variant can be expressed as a computation, a transition, or as one or more other items of data 1221-1223 described herein. Such output 1202 can be generated, for example, by depicted components of primary system 1200 or network 1290 including one or more features as described with reference to FIGS. 3-11.

Figure 13:
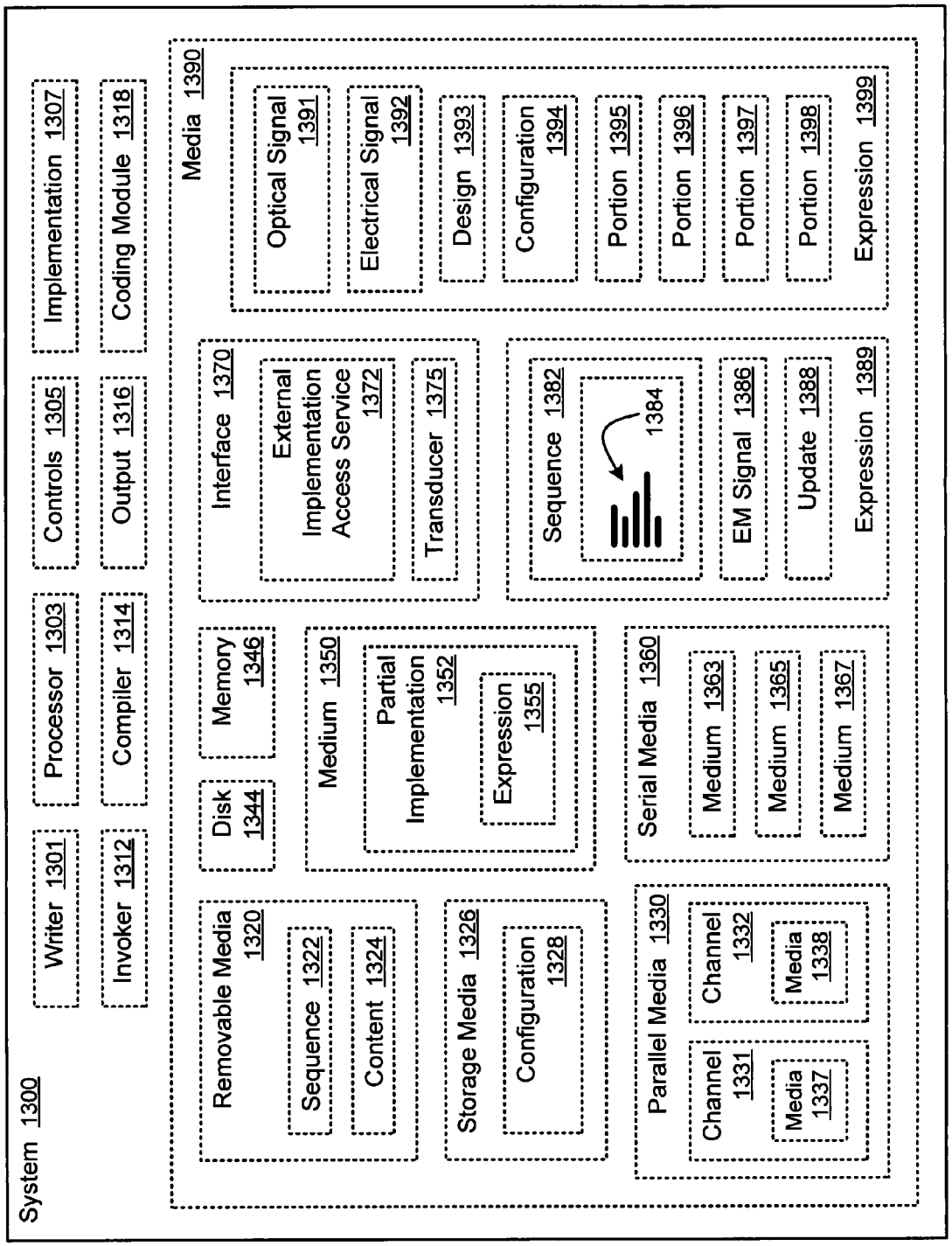

With reference now to FIG. 13, shown is an example of another system that may serve as a context for introducing one or more processes, systems or other articles described herein. As shown system 1300 comprises one or more instances of writers 1301, processors 1303, controls 1305, software or other implementations 1307, invokers 1312, compilers 1314, outputs 1316, coding modules 1318, or the like with one or more media 1390 bearing expressions or outputs thereof. In some embodiments, such media may include distributed media bearing a divided or otherwise distributed implementation or output. For example, in some embodiments, such media may include two or more physically distinct solid-state memories, two or more transmission media, a combination of such transmission media with one or more data-holding media configured as a data source or destination, or the like.

In some embodiments, transmission media may be "configured" to bear an output or implementation (a) by causing a channel in a medium to convey a portion thereof or (b) by constituting, adapting, addressing, or otherwise linking to such media in some other mode that depends upon one or more atypical traits of the partial or whole output or implementation. Data-holding elements of media may likewise be "configured" to bear an output or implementation portion (a) by holding the portion in a storage or memory location or (b) by constituting, adapting, addressing, or otherwise linking to such media in some other mode that depends upon one or more atypical traits of the partial or whole output or implementation. Such atypical traits may include a name, address, portion identifier, functional description, or the like sufficient to distinguish the output, implementation, or portion from a generic object.

In some embodiments described herein, "logic" and similar implementations can include software or other control structures operable to guide device operation. Electronic circuitry, for example, can manifest one or more paths of electrical current constructed and arranged to implement various logic functions as described herein. In some embodiments, one or more media are "configured to bear" a device-detectable implementation if such media hold or transmit a special-purpose device instruction set operable to perform a novel method as described herein. Alternatively or additionally, in some variants, an implementation may include special-purpose hardware or firmware components or general-purpose components executing or otherwise invoking special-purpose components. Specifications or other implementations may be transmitted by one or more instances of transmission media as described herein, optionally by packet transmission or otherwise by passing through distributed media at various times.

In some embodiments, one or more of the coding modules 1318 may be configured with circuitry for applying, imposing, or otherwise using a syntactic or other encoding constraint in forming, extracting, or otherwise handling respective portions of the device-detectable implementation or output. In encoding a software module or other message content, for example, compiler 1314 or coding module 1318 may implement one or more such constraints pursuant to public key or other encryption, applying error correction modes, certifying or otherwise annotating the message content, or implementing other security practices described herein or known by those skilled in the art. Alternatively or additionally, another instance of coding module 1318 may be configured to receive data (via receiver 1233, e.g.) and decode or otherwise distill the received data using one or more such encoding constraints. Compiler 1314 may, in some variants, convert one or more of components 1211-1213 from a corresponding source code form before the component(s) are transmitted across linkage 1250.

System 1300 may be implemented, for example, as one or more instances of stand-alone workstations, servers, vehicles, portable devices, removable media 1320, as components of primary system 1200 or network 1290 (of FIG. 12), or the like. Alternatively or additionally, media 1390 may include one or more instances of signal repeaters 1291, communication satellites 1293, servers 1294, processors 1295, routers 1297, portions of primary system 1200 as shown, or the like.

Media 1390 may include one or more instances of removable media 1320, tapes or other storage media 1326; parallel (transmission) media 1330; disks 1344; memories 1346; other data-handling media 1350; serial media 1360; interfaces 1370; or expressions 1389, 1399. Removable media 1320 can bear one or more device-detectable instances of instruction sequences 1322 or other implementations of flow 200, for example. Alternatively or additionally, in some embodiments, removable media 1320 can bear alphanumeric data, audio data, image data, structure-descriptive values, or other content 1324 in a context that indicates an occurrence of one or more flows 200. In some circumstances, transmission media may bear respective portions of implementations as described herein serially or otherwise non-simultaneously. In some variants in which two portions 1397, 1398 constitute a partial or complete software implementation or product of a novel method described herein, portion 1397 may follow portion 1398 successively through serial media 1363, 1365, 1367 (with transmission of portion 1397 partly overlapping in time with transmission of portion 1398 passing through medium 1363, for example). As shown, parallel channels 1331, 1332 are respectively implemented at least in media 1337, 1338 of a bus or otherwise effectively in isolation from one another. In some embodiments, a bus may be a system of two or more signal paths—not unified by a nominally ideal conduction path between them—configured to transfer data between or among internal or external computer components. For example, one data channel may include a power line (e.g., as medium 1365) operable for transmitting content of the device-detectable implementation as described herein between two taps or other terminals (e.g., as media 1363, 1367 comprising a source and destination). In another such configuration, one or more media 1337 of channel 1331 may bear portion 1397 before, while or after one or more other media 1338 of parallel channel 1332 bear portion 1398. In some embodiments, such a process may occur "while" another process occurs if they coincide or otherwise overlap in time substantially (by several clock cycles, for example). In some embodiments, such a process may occur "after" an event if any instance of the process begins after any instance of the event concludes, irrespective of other instances overlapping or the like.

In a variant in which a channel through medium 1350 bears an expression 1355 partially implementing an operational flow described herein, the remainder of the implementation may be borne (earlier or later, in some instances) by the same medium 1350 or by one or more other portions of media 1390 as shown. In some embodiments, moreover, one or more controls 1305 may configure at least some media 1390 by triggering transmissions as described above or transmissions of one or more outputs 1316 thereof.

In some embodiments, the one or more "physical media" may include one or more instances of conduits, layers, networks, static storage compositions, or other homogenous or polymorphic structures or compositions suitable for bearing signals. In some embodiments, such a "communication channel" in physical media may include a signal path between two transceivers or the like. A "remainder" of the media may include other signal paths intersecting the communication channel or other media as described herein. In some variants, another exemplary system comprises one or more physical media 1390 constructed and arranged to receive a special-purpose sequence 1382 of two or more device-detectable instructions 1384 for implementing a flow as described herein or to receive an output of executing such instructions. Physical media 1390 may (optionally) be configured by writer 1301, transmitter 1232, or the like.

In some embodiments, such a "special-purpose" instruction sequence may include any ordered set of two or more instructions directly or indirectly operable for causing multi-purpose hardware or software to perform one or more methods or functions described herein: source code, macro code, controller or other machine code, or the like. In some embodiments, an implementation may include one or more instances of special-purpose sequences 1382 of instructions 1384, patches or other implementation updates 1388, configurations 1394, special-purpose circuit designs 1393, or the like. Such "designs," for example, may include one or more instances of a mask set definition, a connectivity layout of one or more gates or other logic elements, an application-specific integrated circuit (ASIC), a multivariate transfer function, or the like.

Segments of such implementations or their outputs may (optionally) be manifested one or more information-bearing static attributes comprising the device-detectable implementation. Such attributes may, in some embodiments, comprise a concentration or other layout attribute of magnetic or charge-bearing elements, visible or other optical elements, or other particles in or on a liquid crystal display or other solid-containing medium. Solid state data storage modules or other such static media may further comprise one or more instances of laser markings, barcodes, human-readable identifiers, or the like, such as to indicate one or more attributes of the device-detectable implementation. Alternatively or additionally such solid state or other solid-containing media may include one or more instances of semiconductor devices or other circuitry, magnetic or optical digital storage disks, dynamic or flash random access memories (RAMs), or the like. Magnetoresistive RAMs may bear larger implementation or output portions or aggregations safely and efficiently, moreover, and without any need for motors or the like for positioning the storage medium.

Segments of such implementations or their outputs may likewise be manifested in electromagnetic signals 1386, laser or other optical signals 1391, electrical signals 1392, or the like. In some embodiments, for example, such electrical or electromagnetic signals may include one or more instances of static or variable voltage levels or other analog values, radio frequency transmissions or the like. In some embodiments, the above-mentioned "optical" signals may likewise include one or more instances of time- or position-dependent, device-detectable variations in hue, intensity, or the like. Alternatively or additionally, portions of such implementations or their outputs may manifest as one or more instances of magnetic, magneto-optic, electrostatic, or other physical configurations 1328 of nonvolatile storage media 1326 or as external implementation access services 1372.

In some embodiments, physical media can be configured by being "operated to bear" or "operated upon to bear" a signal. For example, they may include physical media that generate, transmit, conduct, receive, or otherwise convey or store a device-detectable implementation or output as described herein. Such conveyance or storing of a device-detectable implementation or output may be carried out in a distributed fashion at various times or locations, or such conveyance or storing of a device-detectable implementation or output may be done at one location or time. As discussed above, such physical media "operated to bear" or "operated upon to bear" may include physical media that are atypically constituted or adapted to facilitate methods or functions as described herein.

In some configurations, one or more output devices 1236 may present one or more results of obtaining one or more evaluation parameters in association with a message content destination selection in response to interface(s) 1230 receiving one or more invocations or outputs of an implementation of this function via linkage 1250. Such an "invocation" may, in some embodiments, comprise one or more instances of requests, hardware or software activations, user actions, or other determinants as described herein. Alternatively or additionally, in some embodiments, one or more input devices 1238 may later receive one or more invocations or results of transmitting at least a tentative-message-content evaluation result from an application of the one or more evaluation parameters to tentative-message-content. In contexts like these, processor 1295 or other components of network 1290 may likewise constitute a secondary implementation having access to a primary instance of interface 1230 implementing methods like flow 200 as described herein.

Serial media 1360 comprises a communication channel of two or more media configured to bear a transition or other output increment successively. In some embodiments, for example, serial media 1360 may include a communication line or wireless medium (e.g., as medium 1365) between two signal-bearing conduits (e.g., terminals or antennas as media 1363, 1367). Alternatively or additionally, one or more lenses 1231 or other light-transmissive media may comprise a serial medium between a light-transmissive medium and a sensor or other light receiver 1233 or transmitter 1232. In some embodiments, such "light-transmissive" media may (optionally) comprise metamaterials or other media operable for bearing one or more instances of microwave signals, radio-wave signals, visible light signals, or the like.

In some embodiments, such a lens may be an optical element that causes light to converge or diverge along one or more signal paths. Such a light-transmissive medium may include a signal-bearing conduit, glass, or other physical medium through which an optical signal may travel. More generally, a signal-bearing conduit may be an electrical wire, a telecommunications cable, a fiber-optic cable, or a mechanical coupling or other path for the conveyance of analog or digital signals.

Alternatively or additionally, system 1300 may likewise include one or more instances of media for handling implementations or their outputs: satellite dishes or other reflectors 1237, antennas 1235 or other transducers 1375, arrays of two or more such devices configured to detect or redirect one or more incoming signals, caching elements or other data-holding elements (e.g., disks 1344, memories 1346, or other media 1390), integrated circuits 1234, or the like. In some variants, one or more media may be "configured" to bear a device-detectable implementation as described herein by being constituted or otherwise specially adapted for that type of implementation at one or more respective times, overlapping or otherwise. Such "signal-bearing" media may include those configured to bear one or more such signals at various times as well as those currently bearing them.

In some embodiments, such caching elements may comprise a circuit or device configured to store data that duplicates original values stored elsewhere or computed earlier in time. For example, a caching element may be a temporary storage area where frequently-accessed data may be held for rapid access by a computing system. A caching element likewise may be machine-readable memory (including computer-readable media such as random access memory or data disks). In some embodiments, such caching elements may likewise comprise a latching circuit or device configured to store data that has been modified from original values associated with the data (held elsewhere or computed earlier in time, for example).

In one variant, respective portions 1395, 1396 of an expression 1399 of implementation 1307 may be sent through respective channels at various times. Invoker 1312 may request or otherwise attempt to activate a computer program or streaming media overseas via a telephone cable or other channel 1331. Meanwhile, output 1316 may attempt to trigger a session or other partial implementation 1352, success in which may be indicated by receiving expression 1355 into a visual display or other medium 1350. Such a program or other implementation may be made complete, for example, once both of these attempts succeed.

In some embodiments, transducer(s) 1375 may comprise one or more devices that convert a signal from one form to another form. For example, a transducer may be a cathode ray tube that transforms electrical signals into visual signals. Another example of a transducer comprises a microelectromechanical systems ("MEMS") device, which may be configured to convert mechanical signals into electrical signals (or vice versa).

Referring now to FIG. 14, there are shown several variants of the flow 200 of FIG. 2. Operation 260—obtaining one or more evaluation parameters in association with a message content destination selection—may include one or more of the following operations: 1461, 1463, 1464, or 1468. In some embodiments, such a selection may be designated by one or more instances of addresses, group labels, or other designations of one or more intended recipient. Operation 290—transmitting at least a tentative-message-content evaluation result from an application of the one or more evaluation parameters to tentative-message-content—may include one or more of the following operations: 1492, 1493, 1495, or 1498. Such content may be obtained from a user, for example, during or after the destination selection. Alternatively or additionally, one or more segments of the content obtained before the destination selection may be initially processed with a default selection or updated successively according to changing values of the selection of one or more destinations.

In some embodiments, for example, a user might start a text-containing message to user X, and in the process of composing it, get a message that says "if you just call user X now, you may discuss this." Such timely advice may be based on one or more instances of most-recent status data of user X and/or of content attributes as described herein. Alternatively or additionally, in some implementations, analysis module 530 may be configured to indicate location, schedule, or other apparently-current status data (as guidance 594 of FIG. 5 or the like, for example) relating to user Y in response to user Z designating specific text or other content as something of interest to user Y. User Z may find such information useful, for example, in deciding whether, how, or when to forward segment 512 or a reference to it to user Y.

Operation 1461 describes storing at least one profile in association with a destination identifier (e.g. storage manager 410 including one or more profiles 483 in association with one or more identifiers 487 or identifier types 482). This may occur, for example, in embodiments in which invocation module 420 and storage manager 410 jointly perform operation 260 and in which interface 490 performs operation 290. Each such profile may include one or more instances of instructions sequences 432, languages or other semantic rules 434, schedules or other timing information 437, version or other format information 438, or the like in association with one or more respective identifiers 487. Such an association may be established, for example, by inclusion in a common entry 485, by hard coding, by some other form of mapping, or the like. Alternatively or additionally, storage manager 410 may be configured to record an indication of feedback as described herein.

Operation 1463 describes obtaining a definition of at least one object name pattern of the one or more evaluation parameters (e.g. port 492 receiving table 493 mapping one or more object name patterns 470 with one or more corresponding definitions 431 or the like). This may occur, for example, in embodiments in which invocation module 1320 receives destination 1333 from router 1385 and in which invocation module 1320 implements some or all of invocation module 420. Such object name patterns may optionally include one or more types of wildcards 471, 472, exclusions or other type limitations 473, thresholds or other alphanumeric data 476, search-term-like objects or other compound or relational expressions 478, or the like.

Operation 1464 describes identifying more than one potential recipient in the message content destination selection (e.g. directory manager 440 recognizing at least entry 461 and entry 462 of list 460 of user-designated recipients). Such recipients may be designated by a literal or logical identifier, an address, a relational descriptor (like "my father," "the manager of" a person or organization, "all users of" a system, etc.), or the like. This may occur, for example, in embodiments in which such recipients are initially unverified, irrespective of whether any such recipient has previously received any message content.

Operation 1468 describes obtaining at least one gradational threshold in the one or more evaluation parameters (e.g. comparator 455 receiving minimum or maximum reference 456 for comparison with one or more determinants 457 each derived as a respective content attribute 453 of tentative-message-content version 451). In some embodiments, for example, attribute 454 may indicate one or more instances of complexities, lengths, or other quantifiable measures of a corresponding version 452, any of which may be compared against a maximum acceptable value or range. Alternatively or additionally, development times, dimensions, or the like may likewise constitute attributes susceptible of use as or in generating a determinant suitable for comparison against a minimum acceptable value or range.

Operation 1492 describes determining whether the tentative-message-content contains one or more instances of a text data pattern (e.g. search module 550 iteratively searching for words or other terms 551 of the tentative-message-content 503 within one or more listings 558 of topical associations or other categories 552). Different terms 551 of a common category 552 occurring two or more times in tentative-message-content 503, for example, may constitute a noteworthy attribute of the content 503 or of a segment 512 of the content 503. Such content or segment attributes can, for example, constitute a favored or disfavored element from the viewpoint of some recipients. This may occur, for example, in embodiments in which invocation module 577 performs operation 260 and in which other portions of system 500 perform operation 290.

Operation 1493 describes determining whether the tentative-message-content contains one or more instances of an audio data pattern (e.g. analysis module 540 determining whether audio data 571 contains any recognizable expressions 582 or other attributes 574 that are apparently required or forbidden for any recipient potentially within the message content destination selection 578). In some contexts, for example, a given destination's message-rejection patterns, buying patterns, or other response patterns may be aggregated to indicate a model of that destination's behavior containing one or more valuations 579 of respective expressions that may be found in the audio data 571 or other content described herein. Such valuations may be defined, for example, so that some are positive (for apparently-favored content categories, for example) and others are negative.

Operation 1495 describes presenting an integer quantity of more than one instance of a data pattern in the tentative-message-content (e.g. display 497 or speaker 575 indicating that "several" instances of pattern 523 were found within version 520). The resulting presentation 590 may further include one or more instances of descriptions 592 of patterns or rules, specific occurrence counts or other occurrence indicators 591, corresponding raw segments 593 of tentative-message-content, resulting scores 595, acceptable formats or other corrective guidance 594, destinations 596 or destination attributes 597, or the like. This may occur, for example, in embodiments in which valuations 579 are arithmetically or logically combined to generate score 595 or other guidance 594. More than one instance 584 of an expression or other pattern within content 583 may be indicated in respective time segments 587 or other locations along timeline 585, for example. Such configurations of interface 570 may be particularly useful on an organizational scale in effective composition and review targeting one or more destinations as described herein.

Operation 1498 describes indicating a location of a data pattern within the tentative-message-content (e.g. display 498 indicating one or more timeline locations 599 each having a respective instance of a relevant pattern 506 within an audio or video segment 511 of tentative-message-content 503). In some variants, for example, user interface 570 may facilitate a composer unfamiliar with one or more recipients in selecting one or more such instances for closer analysis or content modification. This may occur, for example, in embodiments in which such recipients are customers or other persons in authority. Alternatively or additionally, this may occur in embodiments in which implementation 1270 includes one or more instances of systems 400, 500 operable for performing one or more of the above-described variants of flow 200.

With reference now to FIG. 15, there are shown several variants of the flow 200 of FIGS. 2 & 14. Operation 260—obtaining one or more evaluation parameters in association with a message content destination selection—may include one or more of the following operations: 1564, 1565, 1567, or 1569. In some embodiments, such a selection may be designated by one or more instances of addresses, group labels, or other designations of one or more intended recipient. Operation 290—transmitting at least a tentative-message-content evaluation result from an application of the one or more evaluation parameters to tentative-message-content—may include one or more of the following operations: 1591, 1594, 1596, or 1598.

Operation 1564 describes obtaining a size threshold indication of the one or more evaluation parameters (e.g. port 1021 or parser 1056 obtaining one or more messages 1053 containing one or more instances of length-indicative pattern 1054). This may occur, for example, in contexts in which one or more of systems 1300, 1400 as described herein implement response manager 1003 or in which one or more atypical content object attributes correlate with a failure or success indication. In combination with the size threshold indication relating to an attachment or other object, such attributes may include a filename suffix or other type indicator, an infection-indicative vector or other undesirable pattern within the content, an absence of a watermark or other required pattern within the content, an owner or intermediary identifier, or the like. Alternatively or additionally, the size threshold indication may signify a maximum or minimum number of bytes, seconds, pixels, words, or other size-indicative units. With such an indication, in some embodiments, a potential recipient may effectively indicate how voluminous one or more incoming messages or other objects may be in a given format. Alternatively or additionally, such indications may depend upon or control a signaled resource allocation.

Operation 1565 describes detecting a content type indication of the one or more evaluation parameters from one or more event logs (e.g. extraction logic 772 obtaining one or more such indications 748 directly or indirectly from event log 778 or the like). This may occur, for example, in embodiments in which event log 778 resides in network 180, in primary system 100, or otherwise somewhere accessible to configuration module 720. Alternatively or additionally, invocation module 710 may be configured to activate extraction logic 772 at router 185 or some other such intermediary, or a remote system or destination 133. This may occur, for example, in embodiments in which system 700 is distributed across more than one system. Such extraction may likewise be performed upon one or more instances of event logs or other aggregations as described herein.

Operation 1567 describes detecting at least a portion of the one or more evaluation parameters from non-conveyance-indicative data (e.g. sensor 1073 extracting one or more response modes 1077 or the like from a pattern 1072 of transmission failures, warnings, or other such messages 1070). This may occur, for example, in a context in which error messages are aggregated by content or format indications rather than merely presented chronologically. Alternatively or additionally, recipient preference data or other non-conveyance-indicative data may be provided by the recipient/target in a manner that is independent of any specific message content, optionally before delivery evaluation or message composition begins.

Operation 1569 describes extracting at least a portion of the one or more evaluation parameters from one or more delivery evaluations received from one or more user interfaces (e.g. input device 1026 receiving one or more values 1029 after output device 1023 presents one or more such indications 1025). Examples of such values may include substantially any quantities of resources, such as those described herein. Such indications may optionally be authoritative, explicitly as described by the entity that may apparently apply the filtering rule(s). Alternatively or additionally, the indications may be predictive or otherwise suggestive, such as information or other guidance that may be derived from tentative message content as described herein. Content in which profanity, jargon, or other non-generic elements are detected may trigger such a warning or other indication to that effect, for example, optionally with a further requirement that one or more identified recipients may have an applicable message filtering rule. Alternatively or additionally, such indications may describe a responsive measure available to a composer, for example: "This message may be unsuitable for _____; in order to assure delivery of further content, you may _____."

Operation 1591 describes presenting resource status information of the tentative-message-content evaluation result (e.g. speaker 1133, screen 1136, or other output device 1131 indicating a projected or actual remainder in a physical or virtual inventory 1197 after a corresponding provisional or actual resource allocation 1183). Processor 1175 may compute how many such items 1101, 1102 of one or more kinds remain, for example, by aggregating one or more actual allocations of past event records 1191, 1192 with one or more provisional or actual current resource allocations. In some variants, for example, source system may have a composite inventory of more than one item 1101, 1102 of different types: words, messages, minutes, points, megabytes, exceptions or other tokens that pertain to a specific target or target group, or the like. Inventory 1197 may, for example, implement an inventory of 2 minutes of message time for any of several target systems, and of 5 messages for a specific target system; and of 3 tokens for obtaining an exception to one or more receiver-enforced rules.

Any of target systems, conversely, may likewise implement a recipient authorization or other preference scheme (accepting "only 6 emails from user X" or "only 1000 words a week from user Y," for example). Any such inventory components may optionally be implemented with an expiration date, a rate quota, or other variations as described herein. Alternatively or additionally, other instances of output device 1131 may perform operation 1591, such as by posting one or more provisional transactions as event records 1192. In some variants, operation 1591 may inform a content composer of a potential or actual remainder during composition or otherwise before detecting an apparent authorization to transmit such content.

Operation 1594 describes expressing at least a portion of the tentative-message-content evaluation result as a resource allocation (e.g. transaction processor 1173 executing allocation 1181 by transferring a resource increment 1105 from inventory 1198 to inventory 1196). This may occur, for example, in embodiments in which such inventories 1196, 1198 comprise accounts that may contain resource increments 1105 and in which a source system includes one or more instances of resource manager 1180 configured to perform operation 290. Alternatively or additionally, another portion of such an account (e.g., another increment 1105 of inventory 1198) may be expended or transferred to a third account (inventory 1195, for example) as a part of the transaction that includes the transfer. In some variants, operation 1594 may be performed remotely, such as by port 1177 transmitting a transfer authorization to destination 133, in a context in which destination 133 may perform at least the allocation. This may occur, for example, in embodiments in which destination 133 or router 185 comprises or controls one or more instances of resource manager 1180, and in which destination 133 serves at least partly as a broker, resource handler, or other intermediary.

Operation 1596 describes conveying predictive information of the tentative-message-content evaluation result (e.g. prediction logic 326 conveying one or more indications 327 of how one or more other systems of various types may respond to message content 48). This may occur, for example, in embodiments in which invocation module 120 performs operation 260, in which evaluation module 330 performs operation 290, and in which other one or more other portions of system 300 perform one or more other operations. In some variants, for example, such indications may include one or more instances of destinations, probabilities, thresholds, event history or other supporting data, user preference data, or the like or the like reflecting operational rules 308 or prior events involving the destination(s) Operation 1598 describes selecting at least one feedback component partly based on the one or more evaluation parameters and partly based on the tentative-message-content (e.g. feedback logic 665 excluding component 696 if one or more instances of content type indications 647-651 exclude reference type identifier 655, and otherwise not necessarily excluding component 696). This may occur, for example, in embodiments in which interface 170 performs operation 290 using data received from analysis module 1530, optionally in response to invocation module 120. Components of feedback 680 may filter out one or more instances of warnings 687 or other literal expressions 698 tending to affect how a local individual or system generates or adapts instances of messages 633, for example. Alternatively or additionally, such components may exclude one or more instances of software, parameters, or other logic 686 usable at some later time, for example, to generate or adapt such feedback dependent at least partly on one or more content type indications 651, 652 or the like. Alternatively or additionally, feedback logic 668 may perform operation 1598 by being configured to include component 697 if one or more content type indications 648 include type identifier pattern 635, and otherwise not include component 697, at least in some circumstances. Such decisions may, for example, further depend on one or more other determinants or criteria such as those exemplified herein.

Referring again to FIG. 2, operation 260 may include one or more instances of receiving the delivery evaluation(s) from one or more event logs and/or from one or more user interfaces. As described above with reference to operations 1565 & 1569 (of FIG. 15), such sources may reflect an apparent success or other delivery evaluation, for example, according to the best available information yet provided to a distributed datastructure or other such circuitry.

Alternatively or additionally, operation 260 may include one or more instances of extracting or otherwise obtaining evaluation parameters as described herein. As described above with reference to operation 1564 (of FIG. 15), such parameters may reflect a recipient-specified or other size threshold indication, for example, expressible in a variety of units or other indicia. As described above with reference to operation 1463 (of FIG. 14), such parameters may likewise reflect a specific object name or object name pattern, for example, expressible in terms of text strings, wildcards, or other such syntactic structures. As described above with reference to operation 1565 (of FIG. 15), such parameters may likewise reflect a topical category or other content type indication expressible, for example, in terms of a keyword or similar search term. One or more instances of these or other such parameters may be expressible in substantially any order or combination, as variously exemplified herein.

Alternatively or additionally, operation 260 may include first, second, or other instances of storing profiles in association with respective destination identifiers. A table, instruction sequence, or similar structure may be used for implementing several such associations, for example, some of which are exemplified above with reference to operation 1461.

In such circumstances, alternatively or additionally, operation 260 may likewise include identifying a first potential recipient and a second potential recipient in the message content destination selection, as described above with reference to operation 1464. The above-mentioned associations may likewise be used, in some variants, for selecting profiles each in response to a corresponding association.

Alternatively or additionally, and in various sequences as exemplified herein, operation 290 may include one or more instances of determining whether tentative-message-content contains one or more instances of text data patterns and/or audio data patterns. See, e.g., the description of operations 1492 & 1493 above. In some variants, this and other information can inform feedback component selections to be given in response to tentative-message-content, as exemplified above in relation to operation 1598.

Referring again to FIG. 3, any of the implementations described above with reference to FIGS. 1-13 may likewise include one or more instances of prediction logic 326 or other evaluation modules 330 operable for conveying predictive information of the tentative-message-content evaluation result(s) as exemplified above. This can occur in embodiments in which such instances are implemented in a primary system, for example, and/or in which remote structures are invoked to perform preparatory or other phases of operation 290.

Referring again to FIG. 4, any of the implementations described above with reference to FIGS. 1-13 may likewise include one or more instances of storage manager 410 or other portions of system 400 operable for storing at least one profile in association with a destination identifier as exemplified above. This can occur in embodiments in which such instances are implemented in a local system, for example, and/or in which other systems are invoked to perform follow-through or other phases of operation 260.

Any of such implementations may likewise include one or more instances of directory manager 440 or other features of invocation module 420 operable for identifying more than one potential recipient in the message content destination selection as exemplified above. This can occur in embodiments in which such instances are implemented in a local system, for example, and/or in which remote systems are invoked to perform concurrent or other phases of operation 260.

Any of such implementations may likewise include one or more instances of comparator 455 or other features of invocation module 420 operable for obtaining at least one gradational threshold in the one or more evaluation parameters as exemplified above. This can occur in embodiments in which such instances are invoked iteratively, for example, and/or in which they occur only once during operation 260.

Referring again to FIG. 5, any of the implementations described above with reference to FIGS. 1-13 may likewise include one or more instances of output or bidirectional components of interface 570 operable for presenting an integer quantity of more than one instance of a data pattern in the tentative-message-content as exemplified above. This can occur in embodiments in which such presentations simultaneously include timing or other informational elements pursuant to operation 260, in some variants.

Referring again to FIG. 6, any of the implementations described above with reference to FIGS. 1-13 may likewise include one or more instances of feedback logic 665-667 operable for selecting at least one feedback component partly based on the one or more evaluation parameters and partly based on the tentative-message-content as exemplified above. This can occur in embodiments in which such instances respond synchronously or asynchronously to changes in such parameters or content, in respective variants.

Referring again to FIG. 7, any of the implementations described above with reference to FIGS. 1-13 may likewise include one or more instances of extraction logic 771, 772 operable for detecting a content type indication of the one or more evaluation parameters from one or more event logs as exemplified above. This can occur in embodiments in which such event logs are implemented locally, remotely, in a software agent or other mobile implementation, in a distributed configuration, or otherwise as described herein.

Referring again to FIG. 10, any of the implementations described above with reference to FIGS. 1-13 may likewise include one or more instances of ports 1021 or other components of response manager 1003 operable for obtaining a size threshold indication of the one or more evaluation parameters as exemplified above. This can occur in embodiments in which such indications are actively identified in real time, for example, or in embodiments in which such indications are merely recorded in a latent form suitable for later analysis and extraction as described herein.

Any of such implementations may likewise include one or more instances of sensors 1073, interface circuitry 1020, or other circuitry operable for detecting at least a portion of the one or more evaluation parameters from non-conveyance-indicative data as exemplified above. This can occur in embodiments in which such circuitry is implemented as application-specific or other special-purpose circuitry, for example, or in which such circuitry is implemented by a general purpose processor configured by one or more special-purpose sequences of instructions as described herein.

Any of such implementations may likewise include one or more instances of input devices 1026 or other circuitry operable for extracting at least a portion of the one or more evaluation parameters from one or more delivery evaluations received from one or more user interfaces as exemplified above. This can occur in embodiments in which such circuitry encodes user input directly, for example, or in which such circuitry infers some or all such evaluation parameters from signals received from what appears to be remote user interfaces.

Referring again to FIG. 11, any of the implementations described above with reference to FIGS. 1-13 may likewise include one or more instances of output devices 1131 or other components of interface circuitry 1120 operable for presenting resource status information of the tentative-message-content evaluation result as exemplified above. This can occur in embodiments in which such information reflects availability or other current, past, approximate, or other resource information that may vary over time.

Any of such implementations may likewise include one or more instances of transaction processor 1173 or other circuitry similarly operable for expressing at least a portion of the tentative-message-content evaluation result as a resource allocation, as exemplified above. This can occur in embodiments in which the resource allocation is expressed as "unavailable" or some similar Boolean expression, or in which the resource allocation is expressed as a quantitative or other gradational expression.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/ or quantities). A typical data processing system may be implemented utilizing any suitable commercially available components, such as those typically found in data computing/communication and/or network computing/communication systems.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Although user 110 is shown/described herein as a single illustrated figure, those skilled in the art will appreciate that such users may be representative of a human user, a robotic user (e.g., computational entity), and/or substantially any combination thereof (e.g., a user may be assisted by one or more robotic agents). In addition, each such user, as set forth herein, although shown as a single entity may in fact be composed of two or more entities. Those skilled in the art will appreciate that, in general, the same may be said of "sender" and/or other entity-oriented terms as such terms are used herein.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    obtaining at least one destination identifier associated with a tentative-message-content;
    obtaining one or more evaluation parameters, the one or more evaluation parameters including at least one indication of resource status information, at least partially based on the at least one destination identifier;
    evaluating the tentative-message-content at least partially based on the at least one indication of resource status information associated with the at least one destination identifier, including at least:
        accessing at least one of a virtual or an actual resource inventory;
        aggregating one or more virtual or actual resource allocations; and
        computing a quantity of a resource remaining for future allocation based on the aggregating one or more virtual or actual resource allocations; and
    transmitting at least a tentative-message-content evaluation result, including at least transmitting an indication of the at least one indication of resource status information associated with the tentative-message-content evaluation result,
    wherein at least one of the obtaining at least one destination identifier, obtaining one or more evaluation parameters, evaluating, or transmitting is at least partially implemented using at least one processing device.

2. The method of claim 1, wherein obtaining one or more evaluation parameters, the one or more evaluation parameters including at least one indication of resource status information, at least partially based on the at least one destination identifier comprises:
    detecting a content type indication of the one or more evaluation parameters from one or more event logs.

3. The method of claim 1, wherein obtaining one or more evaluation parameters, the one or more evaluation parameters including at least one indication of resource status information, at least partially based on the at least one destination identifier comprises:
    receiving one or more delivery evaluations associated with the destination identifier from one or more event logs or from one or more user interfaces;
    extracting a size threshold indication of an attachment to a message as a first one of the one or more evaluation parameters from the one or more delivery evaluations;
    extracting a definition of at least one object name pattern as a second one of the one or more evaluation parameters from the one or more delivery evaluations; and
    extracting a content type indication as a third one of the one or more evaluation parameters from the one or more delivery evaluations.

4. The method of claim 1, wherein obtaining the one or more evaluation parameters, the one or more evaluation parameters including at least one indication of resource status information, at least partially based on the at least one destination identifier comprises a first operation, and wherein the evaluating comprises a second, subsequent operation dependent on the output of the evaluation parameter output of the first operation.

5. The method of claim 1, wherein the one or more evaluation parameters are extracted from an event log.

6. The method of claim 1, wherein the one or more evaluation parameters are obtained based at least partially on an association with the destination identifier, and wherein the association between the one or more evaluation parameters and the destination identifier was created based on negative recipient feedback from prior delivery attempts of message content of the same category.

7. The method of claim 1, wherein obtaining one or more evaluation parameters, the one or more evaluation parameters including at least one indication of resource status information, at least partially based on the at least one destination identifier comprises:
    obtaining one or more evaluation parameters, the one or more evaluation parameters including at least one indication of resource status information, at least partially based on the at least one destination identifier, wherein the one or more evaluation parameters alter the evaluation algorithm.

8. A system comprising:
    circuitry for obtaining at least one destination identifier associated with a tentative-message content;
    circuitry for obtaining one or more evaluation parameters, the one or more evaluation parameters including at least one indication of resource status information, at least partially based on the at least one destination identifier;
    circuitry for evaluating the tentative message-content at least partially based on the at least one indication of resource status information associated with the at least one destination identifier, including at least:
        circuitry for accessing at least one of a virtual or an actual resource inventory;
        circuitry for aggregating one or more virtual or actual resource allocations; and
        circuitry for computing a quantity of a resource remaining for future allocation based on the aggregating one or more virtual or actual resource allocations; and
    circuitry for transmitting at least a tentative-message-content evaluation result, including at least transmitting an indication of the at least one indication of resource status information associated with the tentative-message-content evaluation result.

9. The system of claim 8, wherein circuitry for obtaining one or more evaluation parameters, the one or more evaluation parameters including at least one indication of resource status information, at least partially based on the at least one destination identifier comprises:
    circuitry for detecting a content type indication from one or more event logs.

10. The system of claim 8, wherein circuitry for transmitting at least a tentative-message-content evaluation result comprises:
  circuitry for expressing at least a portion of the tentative-message-content evaluation result as at least one of a provisional or actual resource allocation.

11. The system of claim 8, wherein circuitry for transmitting at least a tentative-message-content evaluation result comprises:
  circuitry for conveying predictive information of the tentative-message-content evaluation result.

12. The system of claim 8, wherein circuitry for transmitting at least a tentative-message-content evaluation result comprises:
  circuitry for selecting at least one feedback component partly based on the one or more evaluation parameters and partly based on the tentative-message-content.

13. The system of claim 8, wherein circuitry for obtaining one or more evaluation parameters, the one or more evaluation parameters including at least one indication of resource status information, at least partially based on the at least one destination identifier comprises:
  circuitry for obtaining a size threshold indication of an attachment to a message as one of the one or more evaluation parameters.

14. The system of claim 8, wherein circuitry for obtaining one or more evaluation parameters, the one or more evaluation parameters including at least one indication of resource status information, at least partially based on the at least one destination identifier comprises:
  circuitry for extracting at least a portion of the one or more evaluation parameters from one or more delivery evaluations received from one or more user interfaces.

15. The system of claim 8, wherein circuitry for evaluating the tentative message-content at least partially based on the at least one indication of resource status information associated with the at least one destination identifier comprises:
  circuitry for determining whether the tentative-message-content contains one or more instances of a text data pattern.

16. The system of claim 8, wherein circuitry for evaluating the tentative message-content at least partially based on the at least one indication of resource status information associated with the at least one destination identifier comprises:
  circuitry for determining whether the tentative-message-content contains one or more instances of an audio data pattern.

17. The system of claim 8, wherein circuitry for obtaining one or more evaluation parameters, the one or more evaluation parameters including at least one indication of resource status information, at least partially based on the at least one destination identifier comprises:
  circuitry for obtaining a definition of at least one object name pattern as one of the one or more evaluation parameters.

18. The system of claim 8, wherein circuitry for obtaining one or more evaluation parameters, the one or more evaluation parameters including at least one indication of resource status information, at least partially based on the at least one destination identifier comprises:
  circuitry for receiving one or more delivery evaluations associated with the destination identifier from one or more event logs or from one or more user interfaces;
  circuitry for extracting a size threshold indication of an attachment to a message as a first one of the one or more evaluation parameters from the one or more delivery evaluations;
  circuitry for extracting a definition of at least one object name pattern as a second one of the one or more evaluation parameters from the one or more delivery evaluations; and
  circuitry for extracting a content type indication as a third one of the one or more evaluation parameters from the one or more delivery evaluations.

19. The system of claim 8, wherein circuitry for evaluating the tentative message-content at least partially based on the at least one indication of resource status information associated with the at least one destination identifier comprises:
  circuitry for determining whether the tentative-message-content contains one or more instances of text data;
  circuitry for selecting at least one feedback component partly based on the one or more evaluation parameters and partly based on the tentative-message-content;
  circuitry for presenting resource status information of the tentative-message-content evaluation result;
  circuitry for expressing at least a portion of the tentative-message-content evaluation result as a resource allocation; and
  circuitry for conveying predictive information of the tentative-message-content evaluation result.

20. The system of claim 8, wherein circuitry for transmitting at least a tentative-message-content evaluation result comprises:
  circuitry for transmitting, during composition of the tentative-message-content, guidance to a user based on an authoritative expression of a filtering rule received from an entity that has previously received content from the user, the tentative-message-content evaluation result including the guidance to the user based on the authoritative expression of the filtering rule received from the entity that has previously received content from the user.

21. The system of claim 20, wherein at least one of the one or more evaluation parameters is based on the authoritative expression of the filtering rule received from the entity that has previously received content from the user.

22. The system of claim 8, wherein circuitry for transmitting at least a tentative-message-content evaluation result comprises:
  circuitry for transmitting, during composition of the tentative-message-content, a gradational expression received from an entity associated with the destination identifier, the tentative-message-content evaluation result including the gradational expression received from the entity associated with the destination identifier.

23. The system of claim 22, wherein the one or more evaluation parameters includes the gradational expression.

24. The system of claim 8, wherein circuitry for obtaining one or more evaluation parameters, the one or more evaluation parameters including at least one indication of resource status information, at least partially based on the at least one destination identifier comprises:
  circuitry for comparing a tentative-message-content development time with a threshold of the one or more evaluation parameters.

25. The system of claim 8, wherein circuitry for obtaining one or more evaluation parameters, the one or more evaluation parameters including at least one indication of resource status information, at least partially based on the at least one destination identifier comprises:
  circuitry for obtaining a definition of an object name pattern that includes a relational expression, the one or more evaluation parameters including the object name pattern that includes the relational expression.

26. The system of claim 8, wherein circuitry for obtaining one or more evaluation parameters, the one or more evaluation parameters including at least one indication of resource status information, at least partially based on the at least one destination identifier comprises:

circuitry for storing a profile, the profile including format information, in association with the destination identifier.

27. The system of claim 8, wherein circuitry for obtaining one or more evaluation parameters, the one or more evaluation parameters including at least one indication of resource status information, at least partially based on the at least one destination identifier comprises:

circuitry for storing a profile, the profile including an instruction sequence, in association with the destination identifier.

28. The system of claim 8, wherein circuitry for obtaining one or more evaluation parameters, the one or more evaluation parameters including at least one indication of resource status information, at least partially based on the at least one destination identifier comprises:

circuitry for storing a profile, the profile including one or more human languages, in association with the destination identifier.

29. The system of claim 8, wherein circuitry for transmitting at least a tentative-message-content evaluation result comprises:

circuitry for presenting resource status information, including a remaining number of words or messages, of the tentative-message-content evaluation result.

30. The system of claim 8, wherein circuitry for transmitting at least a tentative-message-content evaluation result comprises:

circuitry for presenting resource status information, including a remaining amount of time, of the tentative-message-content evaluation result.

31. The system of claim 8, wherein tentative-message-content evaluation result comprises feedback to an author of the tentative-message-content, wherein the feedback suggests a modification to the tentative-message-content based on the tentative-message-content and the destination identifier.

32. The system of claim 8, wherein tentative-message-content evaluation result comprises feedback to an author of the tentative-message-content, wherein a feedback component used to generate the feedback is selected based on the one or more evaluation parameters and the tentative-message-content.

33. The system of claim 8, wherein circuitry for obtaining one or more evaluation parameters, the one or more evaluation parameters including at least some resource status information, at least partially based on the at least one destination identifier comprises:

circuitry for identifying one or more virtual or physical inventories; and circuitry for detecting one or more provisional or actual resource allocations.

34. The system of claim 8, wherein circuitry for aggregating one or more virtual or actual resource allocations comprises:

circuitry for aggregating one or more virtual or actual character allocations.

35. The system of claim 8, wherein circuitry for aggregating one or more virtual or actual resource allocations comprises:

circuitry for aggregating one or more virtual or actual data allocations.

36. The system of claim 8, wherein circuitry for aggregating one or more virtual or actual resource allocations comprises:

circuitry for aggregating one or more virtual or actual message allocations.

37. The system of claim 8, wherein circuitry for aggregating one or more virtual or actual resource allocations comprises:

circuitry for aggregating one or more virtual or actual minute allocations.

38. A computer program product comprising:

at least one non-transitory computer readable medium including at least:

one or more instructions configured for obtaining at least one destination identifier associated with a tentative-message-content;

one or more instructions configured for obtaining one or more evaluation parameters, the one or more evaluation parameters including at least one indication of resource status information, at least partially based on the at least one destination identifier;

one or more instructions configured for evaluating the tentative-message-content, wherein the evaluating is at least partially based on the at least one indication of resource status information associated with the at least one destination identifier, including at least:

one or more instructions configured for accessing at least one of a virtual or an actual resource inventory;

one or more instructions configured for aggregating one or more virtual or actual resource allocations; and one or more instructions configured for computing a quantity of a resource remaining for future allocation based on the aggregating one or more virtual or actual resource allocations; and one or more instructions configured for transmitting at least a tentative-message-content evaluation result at least partially based on the at least one indication of resource status information associated with the destination identifier.

39. The computer program product of claim 38, wherein the at least one non-transitory computer readable medium comprises:

a portable module including at least a visual display configured to be operable while the portable module is held or worn.

40. A system comprising:

one or more computing devices; and one or more instructions that, when executed on at least some of the one or more computing devices, cause at least some of the one or more computing devices to at least:

obtain at least one destination identifier associated with a tentative-message-content;

obtain one or more evaluation parameters, the one or more evaluation parameters including at least some resource status information, at least partially based on the at least one destination identifier;

evaluate the tentative-message-content at least partially based on the at least one indication of resource status information associated with the at least one destination identifier, including at least:

accessing at least one of a virtual or an actual resource inventory;

aggregating one or more virtual or actual resource allocations; and computing a quantity of a resource remaining for future allocation based on the aggregating one or more virtual or actual resource allocations; and transmit at least a tentative-message-content evaluation result, including at least transmitting an indication of the at least one indication of resource status information associated with the tentative-message-content evaluation result.

\* \* \* \* \*